(12) United States Patent
Chauvel et al.

(10) Patent No.: US 11,370,267 B2
(45) Date of Patent: Jun. 28, 2022

(54) WORKING VEHICLE

(71) Applicant: KUBOTA CORPORATION, Osaka (JP)

(72) Inventors: Guillaume Chauvel, Argenteuil (FR); Noriyuki Koshida, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 266 days.

(21) Appl. No.: 16/443,300

(22) Filed: Jun. 17, 2019

(65) Prior Publication Data
US 2020/0114724 A1 Apr. 16, 2020

(30) Foreign Application Priority Data
Oct. 10, 2018 (EP) ...................................... 8306337

(51) Int. Cl.
| | |
|---|---|
| *B60H 1/00* | (2006.01) |
| *B62D 33/06* | (2006.01) |
| *B01D 46/00* | (2022.01) |
| *B01D 46/42* | (2006.01) |
| *B01D 46/62* | (2022.01) |

(52) U.S. Cl.
CPC ..... *B60H 1/00457* (2013.01); *B01D 46/0087* (2013.01); *B01D 46/4227* (2013.01); *B01D 46/62* (2022.01); *B62D 33/0617* (2013.01); *B01D 2273/16* (2013.01); *B01D 2279/50* (2013.01)

(58) Field of Classification Search
CPC ............ B60H 1/00457; B01D 46/0023; B01D 46/0087; B01D 46/4227; B01D 2273/16; B01D 2279/50; B62D 33/0617

USPC ...................................................... 55/385.3
See application file for complete search history.

(56) References Cited

FOREIGN PATENT DOCUMENTS

| | | | | |
|---|---|---|---|---|
| DE | 102014225272 | | 7/2015 | |
| EP | 2505403 A2 | | 3/2012 | |
| EP | 2805840 | | 11/2014 | |
| EP | 3318434 | | 5/2018 | |
| JP | 2018-138840 A | | 9/2018 | |
| JP | 2018138840 A | * | 9/2018 | ............ F24F 1/0014 |
| WO | WO2014/027159 | | 2/2014 | |
| WO | WO-2014027159 A1 | * | 2/2014 | ........... B60H 3/0625 |

(Continued)

OTHER PUBLICATIONS

Office Action issued in European Patent Office (EPO) Counterpart Patent Appl. No. 18306337.9-1012, dated Jun. 18, 2019.

*Primary Examiner* — T. Bennett McKenzie
*Assistant Examiner* — Qianping He
(74) *Attorney, Agent, or Firm* — Greenblum & Bernstein, P.L.C.

(57) ABSTRACT

A working vehicle includes a cabin and an outside air inlet portion. The working vehicle further includes: a filter device having: a first filter providing a first filtering level; and a second filter providing a second filtering level that is a filtering level higher than the first filtering level; an air conditioning unit to which the outside air having passed through the filter device is supplied; and a filter changing mechanism having: a first state to allow the outside air to pass through only the first filter; and a second state to allow the outside air to pass through at least the second filter among the first filter and the second filter, the filter changing mechanism being configured to be selectively switched to the first state or the second state.

9 Claims, 15 Drawing Sheets

(56) References Cited

FOREIGN PATENT DOCUMENTS

| WO | WO2016/005406 | 1/2016 | |
| WO | WO-2016005406 A1 * | 1/2016 | ........... B60H 3/0641 |
| WO | WO 2016/158250 | 10/2016 | |
| WO | WO-2016158250 A1 * | 10/2016 | ............... B60H 1/00 |

* cited by examiner

FIG.7
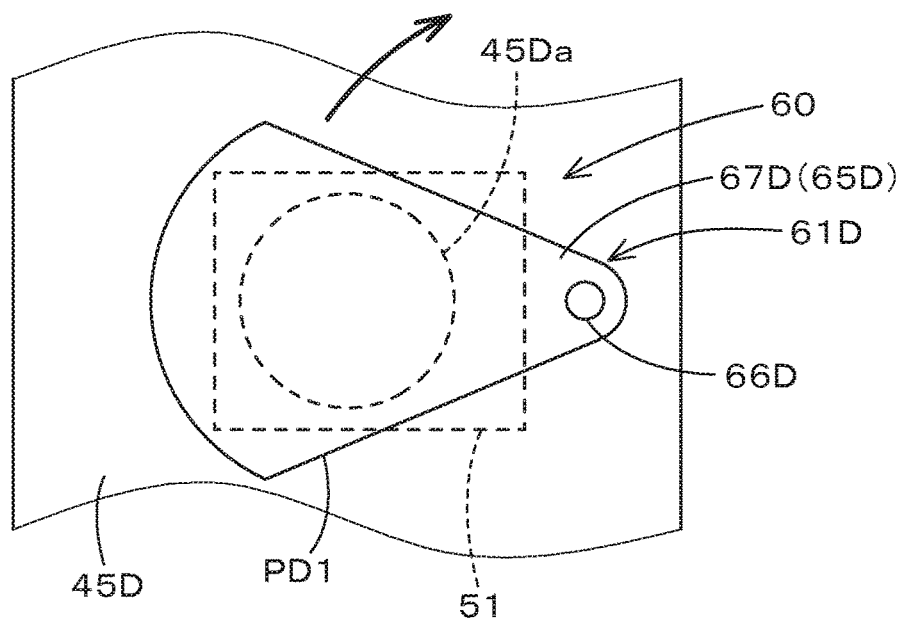
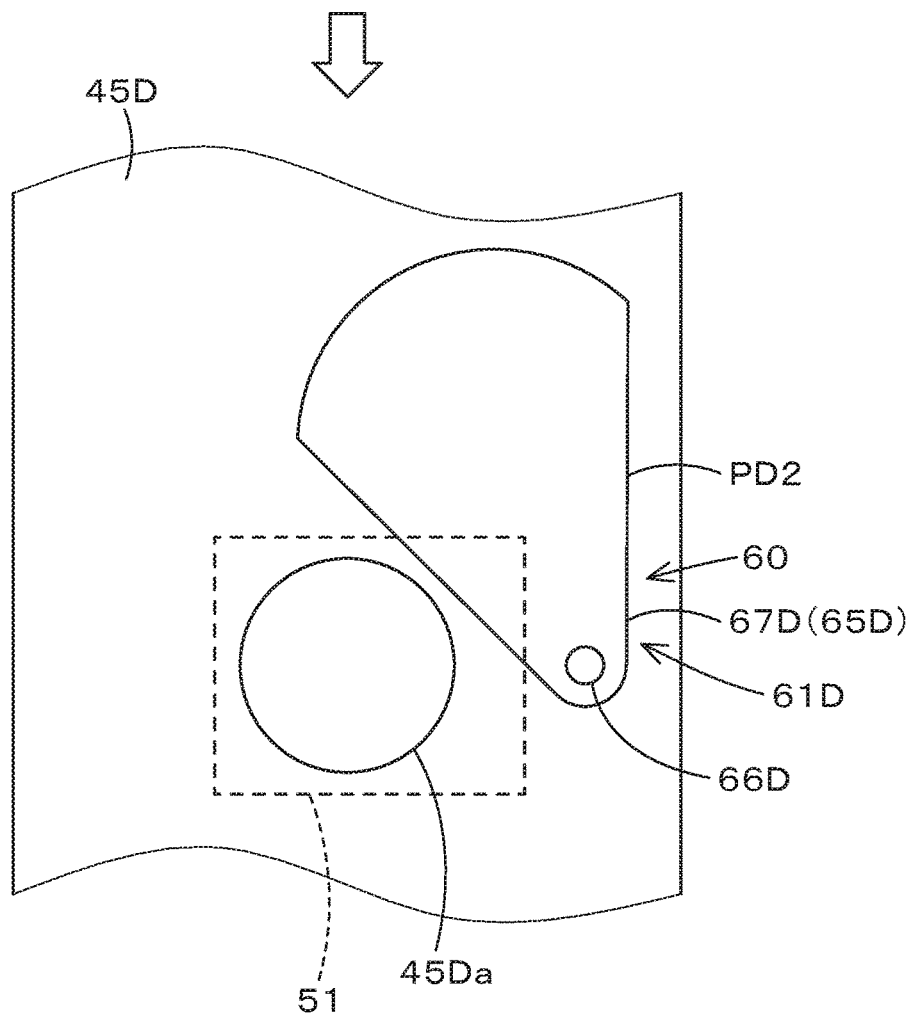

FIG.13
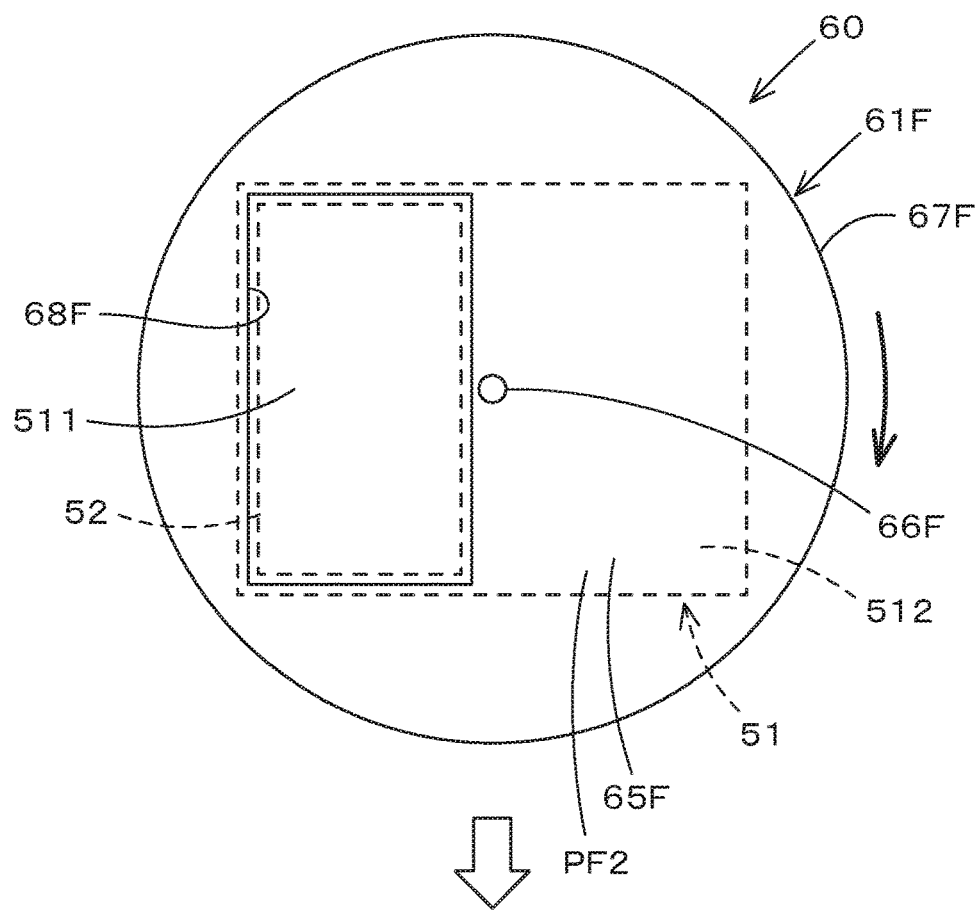
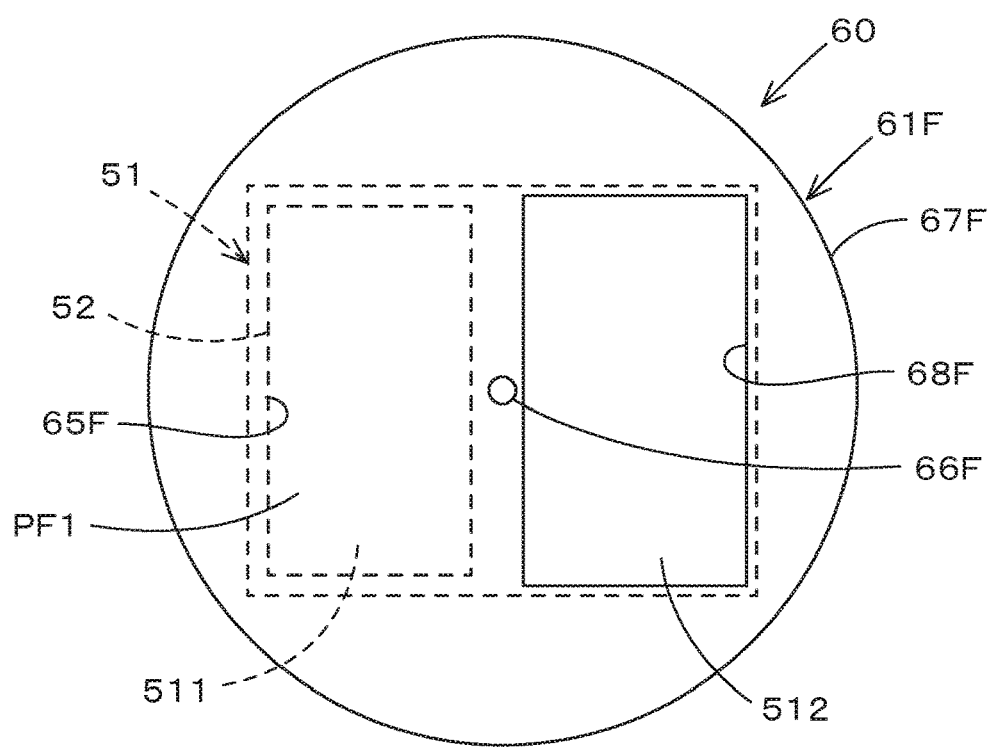

WORKING VEHICLE

CROSS-REFERENCE TO RELATED APPLICATIONS

The present application claims priority under 35 U.S.C. § 119 to European Patent Application No. 18306337.9, filed Oct. 10, 2018. The content of this application is incorporated herein by reference in their entirety.

BACKGROUND OF THE INVENTION

Field of the Invention

The present invention relates to a working vehicle such as a tractor having a filter device that filtrates the outside air.

Discussion of the Background

A working vehicle (a tractor) disclosed in European Patent Application Publication No. EP2505403A2 (hereinafter referred to as Patent Document 1) has been conventionally known. The working vehicle disclosed in Patent Document 1 includes a cabin, an intake portion provided in an upper portion of the cabin, and a filter configured to filtrate the outside air taken from the intake portion.

SUMMARY OF THE INVENTION

Problems to be Solved by the Invention

The working vehicle is configured to filtrate the outside air with a filter. However, because only one kind of filter is employed, it has been necessary to replace the filter with another filter having filtration performance corresponding to a content of an operation according to the content of the operation (for example, a chemical spraying operation and the like).

The present invention has been achieved to solve the above-mentioned problems of the conventional technique, and it is an object of the present invention to provide a working vehicle having a filtration device configured to surely exert a filtration performance corresponding to a content of an operation without replacing a filter in each content of the operation.

Means to Solve the Problems

In a first aspect of the present invention, a working vehicle comprises: a cabin; and an outside air inlet portion configured to take outside air that is to be introduced to the cabin. The working vehicle further comprises: a filter device through which the outside air taken from the outside air inlet portion passes, having: a first filter providing a first filtering level; and a second filter providing a second filtering level that is a filtering level higher than the first filtering level; an air conditioning unit to which the outside air having passed through the filter device is supplied; and a filter changing mechanism having: a first state to allow the outside air to pass through only the first filter; and a second state to allow the outside air to pass through at least the second filter among the first filter and the second filter, the filter changing mechanism being configured to be selectively switched to the first state or the second state.

The filter changing mechanism allows the outside air to pass through both of the first filter and the second filter under the second state.

The filter changing mechanism allows the outside air to pass through not the first filter but the second filter under the second state.

The first filter is arranged upper than the second filter in a direction of stream of the outside air flowing from the outside air inlet portion toward the air conditioning unit.

The filter changing mechanism includes: a blocking portion configured to block stream of the outside air flowing toward the filter device; and a movable member configured to move the blocking portion between a first position and a second position, wherein the first state is established when the blocking portion is moved to the first position, and wherein the second state is established when the blocking portion is moved to the second position.

The movable member includes: a support shaft; and a swing plate configured to be swung about the support shaft to move the blocking portion between the first position and the second position.

The movable member includes: a rotating shaft; and a rotating plate configured to be rotated with the rotating shaft to move the blocking portion between the first position and the second position.

The movable member is constituted of a slide plate configured to be slid to move the blocking portion between the first position and the second position.

The filter changing mechanism includes a filter moving mechanism having: a ventilating position to allow the outside air to pass through the second filter; and a non-ventilating position to prevent the outside air from passing through the second filter, the filter moving mechanism being configured to move the second filter selectively between the ventilating position and the non-ventilating position.

The outside air inlet portion includes: a first outside air inlet portion arranged on one side of the cabin in a width direction of the cabin; and a second outside air inlet portion arranged on the other side of the cabin in the width direction of the cabin, and wherein the first filter includes: a one-side filter through which the outside air taken from the first outside air inlet portion; and an other-side filter through which the outside air taken from the second outside air inlet portion.

The working vehicle mentioned above comprises a roof arranged on an upper portion of the cabin, wherein the air conditioning unit is arranged on a front portion of the roof, and wherein the filter device is arranged on a rear portion of the roof.

The working vehicle mentioned above comprises a roof arranged on an upper portion of the cabin, wherein the air conditioning unit and the filter device are arranged on a rear portion of the roof.

The working vehicle mentioned above comprises an inside-air/outside-air changing mechanism configured to change a ratio between the outside air and air in the cabin in supplied air to the air conditioning unit, wherein the filter device is arranged upper than the inside-air/outside-air changing mechanism in a direction of stream of the outside air flowing from the outside air inlet portion toward the air conditioning unit.

Effects of the Invention

According to the working vehicle mentioned above, the filter changing mechanism is capable of being selectively switched between the first state in which the outside air is allowed to pass through only the first filter and the second state in which the outside air is allowed to pass through at least the second filter among the first filter and the second filter. In this manner, by selectively switching between the first state and the second state depending on the content of the operation (for example, a chemical spraying operation and the like), it is possible to reliably exert a filtration performance corresponding to a content of an operation without replacing the filter in each content of the operation.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a plan view illustrating a state where a blocking portion moves from a first position to a second position according to the first example.

FIG. 13 is a plan view illustrating a state where a blocking portion moves from a first position to a second position according to the eighth example.

DESCRIPTION OF THE EMBODIMENTS

Figure 1:
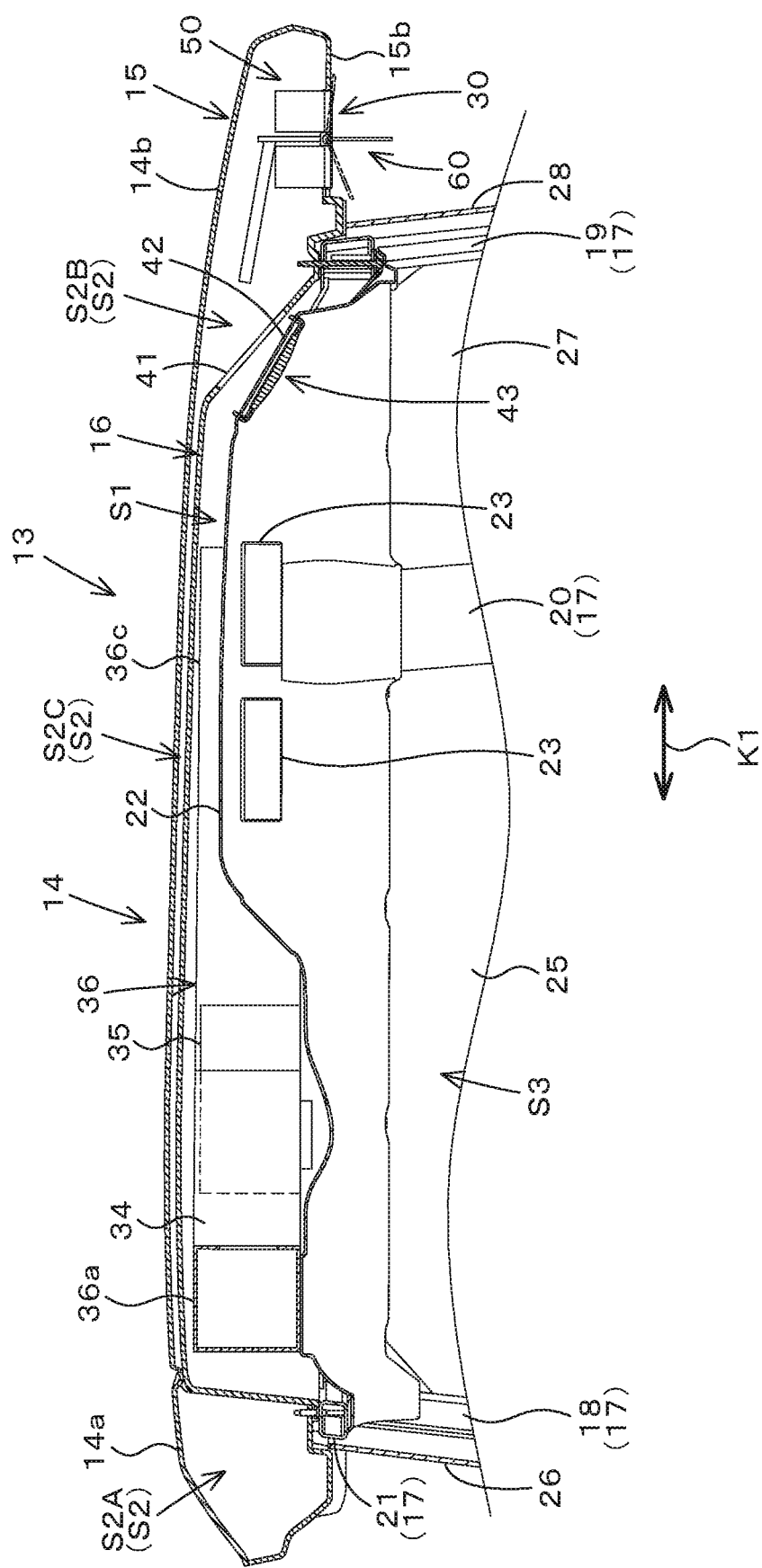
FIG. 1 is a view illustrating a vertical cross section of an internal structure of a roof according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described below with reference to the drawings as appropriate.

Figure 15:
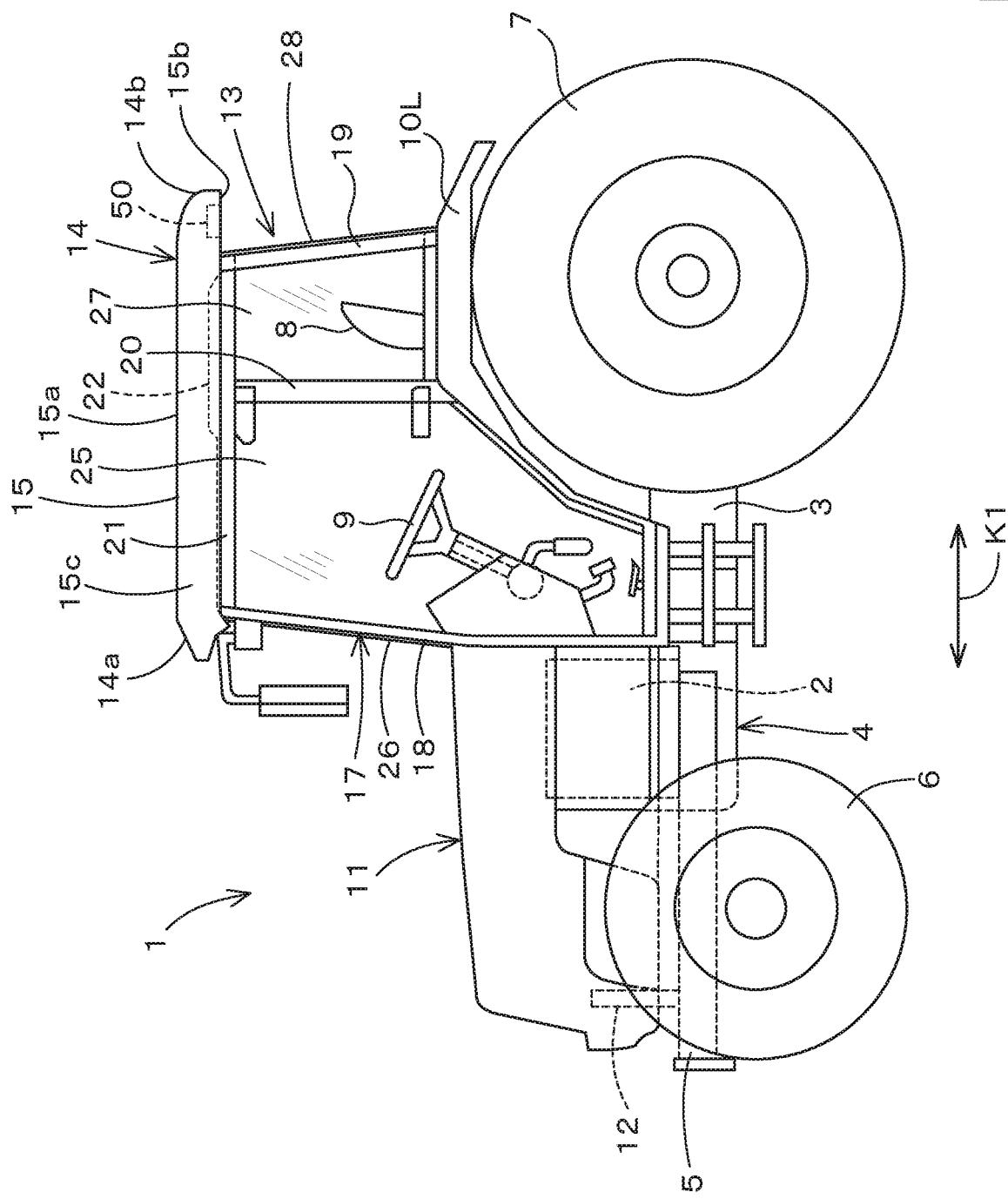
FIG. 15 is a view illustrating a side surface of a working vehicle according to the embodiment.

FIG. 15 is a side view of a working vehicle 1. The working vehicle 1 according to the present embodiment is a tractor (referred to as a tractor 1). Hereinafter, the working vehicle 1 will be explained assuming that the working vehicle 1 is the tractor 1. However, the working vehicle 1 is not limited to the tractor.

Hereinafter, a front side (a left side in FIG. 15) of an operator seated on the operator seat 8 of the tractor 1 will be referred to as the front. A rear side (a right side in FIG. 15) of the operator will be referred to as the rear. A left side (a front surface side of FIG. 15) of the operator will be referred to as the left. A right side (a back surface side of FIG. 15) of the operator will be referred to as the right. Further, a direction indicated by an arrowed line K1 in FIG. 15 will be referred to as a front-rear direction K1. In addition, a horizontal direction K2 (refer to FIG. 2), which is a direction orthogonal to the front-rear direction K1, will be referred to as a vehicle width direction.

As shown in FIG. 15, the tractor 1 has an engine 2, a traveling vehicle body 4 constituted by being connected to a transmission case 3 and the like, a left front wheel 6, a right front wheel 6, a left rear wheel 7, and a right rear wheel 7. A front axle frame 5 and a bonnet 11 are provided at a front portion of the traveling vehicle body 4.

The front axle frame 5 is provided so as to extend forward from the engine 2. The bonnet 11 is provided so as to be freely opened and closed, and forms an engine room for housing the engine 2 and the like at a front portion of the traveling vehicle body 4. The engine room houses the engine 2, a battery 12, and the like. The battery 12 may be arranged at a place other than the engine room, for example, below a muffler or elsewhere.

A cabin 13 is mounted on a rear portion of the traveling vehicle body 4. Inside the cabin 13, an operator seat 8 is provided. A steering wheel 9 is provided in front of the operator seat 8.

The cabin 13 has a cabin frame 17 and a roof 14.

The cabin frame 17 is fixed to the traveling vehicle body 4. The cabin frame 17 has a front support pillar 18, a rear support pillar 19, an intermediate support pillar 20, and an upper frame body 21. The front support pillar 18 is provided on a left front side of the operator seat 8, and another front support pillar 18 is provided on a right front side of the operator seat 8. The rear support pillar 19 is provided on a left rear side of the operator seat 8, and another rear support pillar 19 is provided on a right rear side of the operator seat 8. The intermediate support pillar 20 is provided between the front support pillar 18 and the rear support pillar 19.

A door 25 is supported on the intermediate support pillar 20 so that the door 25 can be opened and closed. A front window 26 is provided between the front support pillars 18 disposed on the left and the front support pillars 18 disposed on the right. A side window 26 is provided between the intermediate support pillar 20 and the rear support pillar 19. A rear window 28 is provided between the rear support pillars 19 disposed on the left and the rear support pillars 19 disposed on the right.

Figure 2:
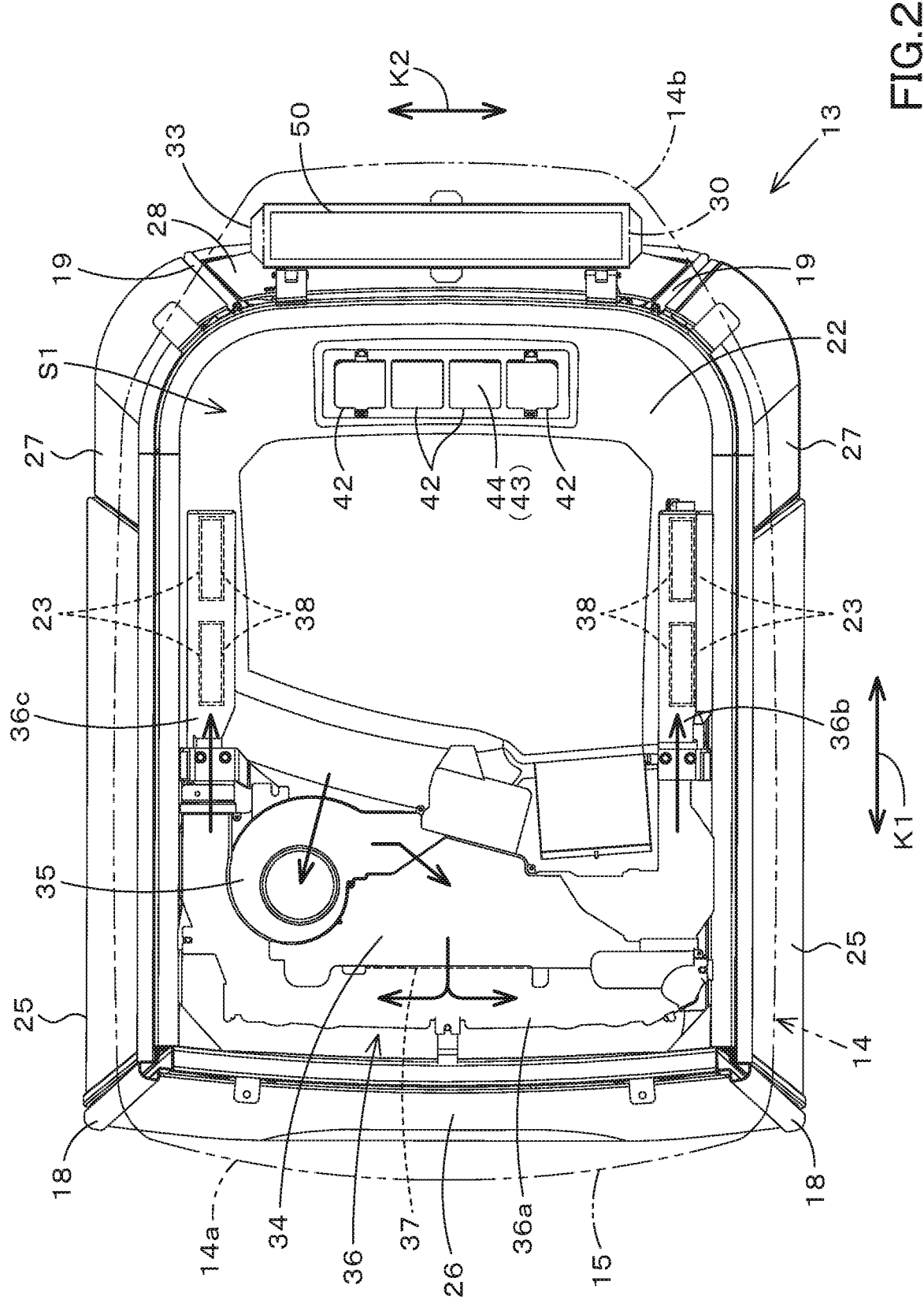
FIG. 2 is a plan view illustrating the internal structure of the roof according to the embodiment.

The upper frame body 21 is formed to have a rectangular frame shape, and is fixed to the upper ends of the front support pillar 18, the rear support pillar 19, and the intermediate support pillar 20. A ceiling plate 22 constituting a ceiling of an inside of the cabin 13 is supported on the upper frame body 21. As shown in FIG. 1 and FIG. 2, a blow outlet 23 for blowing conditioned air is formed in a left portion of the ceiling plate 22, and another blow outlet 23 for blowing conditioned air is formed in a right portion of the ceiling plate 22.

The roof 14 is provided on an upper portion of the cabin frame 17. Specifically, the roof 14 is fixed to an upper portion of the upper frame body 21. The roof 14 has a front protruding portion 14a protruding forward from the front support pillar 18. Further, the roof 14 has a rear protruding portion 14b protruding rearward from the rear support pillar 19.

As shown in FIG. 1, the roof 14 has an outer roof 15 and an inner roof 16. As shown in FIG. 15, the outer roof 15 constitutes an outer surface of the roof 14. The outer roof 15 has an upper plate portion 15a, a lower plate portion 15b, and a side plate portion 15c. The upper plate portion 15a constitutes an upper surface of the roof 15. The lower plate portion 15b constitutes a lower surface of the roof 15. The side plate portion 15c constitutes a side surface of the roof 15.

Figure 3:
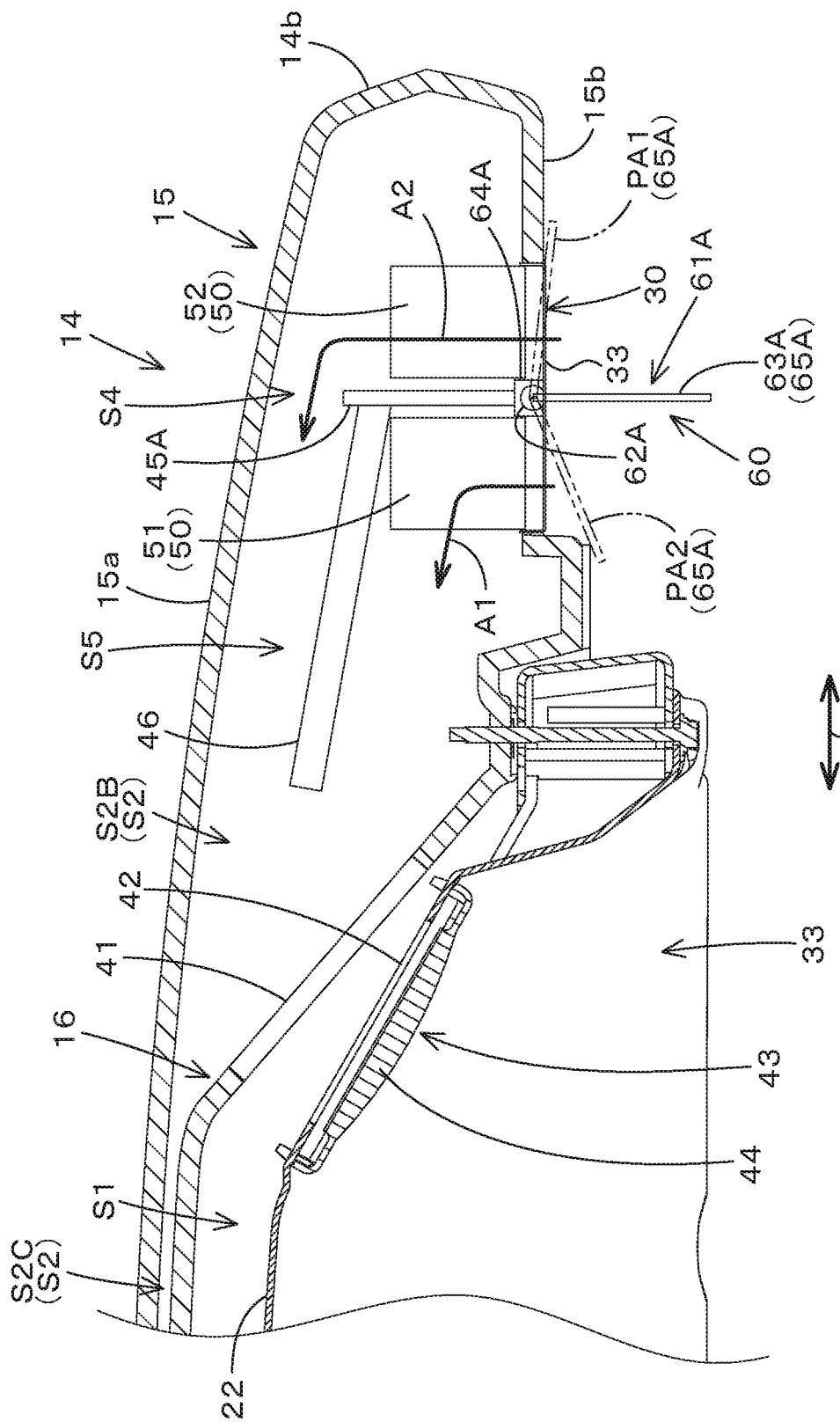
FIG. 3 is a view illustrating a vertical cross section of configurations of a filter device and a filter changing mechanism according to a first example of the present embodiment.

A front portion of the outer roof 15 constitutes the front protruding portion 14a. The rear portion of the outer roof 15 constitutes the rear protruding portion 14b. As shown in FIG. 1 to FIG. 3 and the like, an outside air intake portion 30 is formed in the outer roof 15, the outside air intake portion 30 being formed for taking the outside air to be introduced to the cabin 13. The outside air intake portion 30 is formed in a lower portion (the lower plate portion 15b) of the rear protruding portion 14b of the outer roof 15 and is opened downward. However, the outside air intake portion 30 may be provided at another position (the upper plate portion 15a, the side plate portion 15c, and the like) of the outer roof 15. As shown in FIG. 2 and FIG. 3, a ventilation plate 33 is attached to the outside air intake portion 30 so as to cover the outside air intake portion 30. The ventilation plate 33 is constituted of a plate configured to allow ventilation, for example, constituted of a perforated plate or a mesh plate.

As shown in FIG. 1, the inner roof 16 is provided inside the outer roof 15. The inner roof 16 is attached to the upper frame body 21. The inner roof 16 is provided above the ceiling plate 22. A first space S1 is formed between the inner roof 16 and the ceiling plate 22. As shown in FIG. 1 and FIG. 2, an air conditioning unit 34, a fan 35, and a duct 36 are arranged in the first space S1.

The air conditioning unit 34 is composed of an HVAC unit (Heating, Ventilating, and Air-Conditioning unit). The air conditioning unit 34 is constituted of a compressor, a capacitor, a receiver, an expansion valve, an evaporator, and the like. The air conditioning unit 34 is arranged in front of the roof 14. However, the air conditioning unit 34 may be arranged at the rear portion of the roof 14.

The fan 35 is arranged on a front portion of the roof 14, and is connected to the air conditioning unit 34. The fan 35 is a sirocco fan configured to blow air toward the side of the fan, the air being sucked in from above. The fan 35 takes the air being in the first space S1 from above, and sends the air to the air conditioning unit 34 arranged in front of the fan 35. In this manner, the fan 35 generates a flow of the air flowing from the outside air intake portion 30 toward the air conditioning unit 34 (flowing from the rear to the front).

As shown in FIG. 2, the duct 36 has a first portion 36a, a second portion 36b, and a third portion 36c. The first portion 36a is arranged on a front portion of the first space S1, and extends in the vehicle width direction K2. The first portion 36a is positioned in front of the air conditioning unit 34. The second portion 36b is arranged on a left portion of the first space S1, and extends in the front-rear direction K1. A front end portion of the second portion 36b is connected to a left end portion of the first portion 36a. The third portion 36c is arranged on a right portion of the first space S1, and extends in the front-rear direction K1. A front end portion of the third portion 36c is connected to a right end portion of the first portion 36a.

An introduction port 37 is formed in the first portion 36a, and the air having passed through the air conditioning unit 34 is introduced into the introduction port 37. A blow port 38 is formed in the second portion 36b, through which the air is supplied to the blow outlet 23 formed at the left portion of the ceiling plate 22. Another blow port 38 is formed in the third portion 36c, through which the air is supplied to the blow outlet 23 formed at the right portion of the ceiling plate 22. The air having passed through the air conditioning unit 34 is introduced into the duct 36 from the introduction port 37 of the first portion 36a. The air introduced into the duct 36 is guided to the second portion 36b and the third portion 36c, passes through the blow port 38, and then is discharged from the blow outlet 23 to the internal space S3 of the cabin 13 (the space formed below the ceiling plate 22) (refer to FIG. 1).

As shown in FIG. 1, a second space S2 is formed between the inner roof 16 and the outer roof 15. The second space S2 has a front space S2A, a rear space S2B, and a connection space S2C. The front space S2A is formed in the front protruding portion 14a. The rear space S2B is formed in the rear protruding portion 14b. The connection space S2C connects the front space S2A and the rear space S2B to each other. The front space S2A and the rear space S2B are communicated with each other through the connection space S2C. However, the front space S2A, the rear space S2B, and the connection space S2C may be spaces mutually independent from each other (not communicated with each other). In addition, the second space 52 has the front space S2A and the rear space S2B, but may be a space not having the connection space S2C.

As shown in FIG. 1, FIG. 3, and the like, a first opening portion 41 is formed in a rear portion of the inner roof 16. The first space S1 and the second space S2 (the rear space S2B) are communicated with each other through the first opening portion 41. As shown in FIG. 1 to FIG. 3, a second opening portion 42 is formed in the ceiling plate 22. The first space S and the internal space S3 of the cabin are communicated with each other through the second opening portion 42. As shown in FIG. 2, the second opening portion 42 is constituted of a plurality of holes (four holes) aligned in the vehicle width direction, but the second opening portion 42 may be constituted of a single hole.

As shown in FIG. 3, an inside-air/outside-air changing mechanism 43 is provided in the vicinity of the first opening portion 41 and the second opening portion 42. The inside-air/outside-air changing mechanism 43 is a mechanism configured to change a ratio between the outside air and the inside air (the air inside the cabin 13) in the air to be supplied to the air conditioning unit 34. As shown in FIG. 2 and FIG. 3, the inside-air/outside-air changing mechanism 43 has a shutter 44 configured to be movable. The shutter 44 is capable of being moved by a manual operation, an electric actuator, or the like. The inside-air/outside-air changing mechanism 43 is configured to move the shutter 44 to be switched between a closed state and an opened state, the closed state allowing the second opening portion 42 to be closed by the shutter 44, the opened state allowing the second opening portion 42 not to be closed by the shutter 44. Regardless of the movement of the shutter 44, the first opening portion 41 is maintained to be in the opened state.

When the second opening portion 42 is in the closed state, only the outside air taken from the outside air intake portion 30 into the second space S2 passes through the first opening portion 41, is introduced into the first space S1, and then is supplied to the air conditioning unit 34. That is, the inside-air/outside-air changing mechanism 43 will be in an inside air blocking state for blocking the supply of the inside air to the air conditioning unit 34. In the inside air blocking state, only the air outside the cabin 13 (the outside air) will be supplied to the air conditioning unit 34 for the air conditioning.

When the second opening portion 42 is in the open state, the air inside the cabin 13 (the inside air) is introduced into the first space S1 through the second opening portion 42. In addition, the outside air taken from the outside air intake portion 30 into the second space S2 is also introduced into the first space S1 through the first opening portion 41. In this manner, a mixed air of the air inside the cabin 13 (the inside air) and the outside air taken from the outside air intake portion 30 is supplied to the air conditioning unit 34. That is, the inside-air/outside-air changing mechanism 43 will be in a inside air allowable state, the inside air allowable state allowing the inside air to be supplied to the air conditioning unit 34. Under the inside air allowable state, the air inside the cabin 13 (the inside air) and the air outside the cabin 13 (the outside air) will be supplied to the air conditioning unit 34 for the air conditioning.

Meanwhile, the inside-air/outside-air changing mechanism 43 may be configured to be switched between a state of opening the first opening portion 41 and of closing the second opening portion 42 and another state of closing the first opening portion 41 and of opening the second opening portion 42.

In that case, when the first opening portion 41 is opened and the second opening portion 42 is closed, only the outside air taken from the outside air intake portion 30 into the second space S2 flows through the first opening portion 41, is introduced into the first space S1, and then is supplied to the air conditioning unit 34. That is, the inside-air/outside-air changing mechanism 43 will be in an inside air blocking state for blocking the inside air from being supplied to the air conditioning unit 34. Under the inside air blocking state, only the air outside the cabin 13 (the outside air) will be supplied to the air conditioning unit 34 for the air conditioning.

When the first opening portion 41 is closed and the second opening portion 42 is opened, the air in the internal space S3 (the inside air) of the cabin 13 passes through the second opening portion 42, is introduced into the first space S1, and then is supplied to the air conditioning unit 34. In addition, since the first opening portion 41 is closed, the outside air taken from the outside air intake portion 30 into the second space 52 is not introduced into the first space S1, and is not supplied to the air conditioning unit 34. That is, the inside-air/outside-air changing mechanism 43 will be in the inside air allowable state for allowing the inside air to be supplied to the air conditioning unit 34. Under the inside air allowable state, the outside air is blocked from being supplied to the air conditioning unit 34, and thus the air inside the cabin 13 can be circulated to be supplied to the air conditioning unit 34 for the air conditioning.

In addition, the inside-air/outside-air changing mechanism 43 may be configured to be switched between a closed state in which the first opening portion 41 is closed by the shutter 44 and an opened state in which the first opening portion 41 is not closed by the shutter 44. In that case, irrespective of the movement of the shutter 44, the second opening portion 42 is maintained to be in the opened state. Thus, the inside-air/outside-air changing mechanism 43 is capable of being switched between a state for allowing only the inside air to be supplied to the air conditioning unit 34 (blocking the outside air from being supplied) and a state for allowing the inside air and the outside air to be supplied to the air conditioning unit 34.

As shown in FIG. 3 and the like, the roof 14 (the outer roof 15) is provided with a filter device 50 and a filter changing mechanism 60.

The outside air taken from the outside air intake portion 30 passes through the filter device 50. The outside air taken from the outside air intake portion 30 is filtrated by passing through the filter device 50. The air having passed through the filter device 50 is supplied to the air conditioning unit 34.

The filter device 50 is arranged at the rear portion of the roof 14. In particular, the filter device 50 is arranged in the second space S2. More specifically, the filter device 50 is arranged in the rear space S2B in the rear protruding portion 14b. In addition, the filter device 50 is arranged closer to an upstream side of the outside air flowing from the outside air intake portion 30 toward the air conditioning unit 34 (hereinafter also simply referred to as "an outside air flow direction") than the inside-air/outside-air changing mechanism 43. In other words, a length of the path from the filter device 50 to the air conditioning unit 34 is longer than a length of the path from the inside-air/outside-air changing mechanism 43 to the air conditioning unit 34.

The filter device 50 includes a first filter 51 and a second filter 52. The first filter 51 is a filter having a first filtration level. The second filter 52 is a filter having a second filtration level, the second filtration level being different from the first filtration level. The second filtration level is higher than the first filtration level. The second filtration level provides a filtrating performance higher than that of the first filtration level. That is, the second filter 52 is a filter having a higher filtering performance than the first filter 51. Specifically, the first filter 51 is a filter satisfying the filtering requirements of Category 2 according to the European Standard (EN 15695), for example. The second filter 52 is a filter satisfying the filtering requirements of Category 3 or Category 4 according to the European Standard (EN 15695). The first filter 51 can catch sands and dusts (dirt). The second filter 52 can catch fine particles (aerosols), gas, chemicals, and the like in addition to the sands and dusts. The second filter 52 can catch, for example, spray substances to be sprayed on the field (an agrichemical such as a herbicide or an insecticide, a fertilizer, and the like) by a spraying device attached to the tractor 1.

The filter changing mechanism 60 is configured to be selectively switched between a first state and a second state. The first state allows the outside air to pass through only the first filter 51. The second allows the outside air to pass through at least the second filter 52 among the first filter 51 and the second filter 52. Under the second state, the filter changing mechanism 60 may be a mechanism configured to allow the outside air to pass through both of the first filter 51 and the second filter 52, or may be a mechanism configured to allow the outside air to pass through only the second filter 52.

In the case where the filter changing mechanism 60 allows the outside air to pass through both the first filter 51 and the second filter 52 under the second state, the order of the passage of the outside air is not limited. The outside air may pass through the first filter 51 first or pass through the second filter 52 first. Specifically, it may be a configuration (a first configuration) in which the outside air passes through the first filter 51 first and then passes through the second filter 52, or a configuration (a second configuration) in which the outside air passes through the first filter 51 after the outside air passes through the second filter 52.

In the case of the first configuration, the first filter 51 is arranged on the upper stream side (the side close to the outside air intake portion 30) than the second filter 52 in the flow direction of the outside air flowing from the outside air intake portion 30 toward the air conditioning unit 34. In the case of the second configuration, the second filter 52 is arranged on the upper stream side (the side closer to the outside air intake portion 30) than the first filter 51 in the flow direction of the outside air.

In other words, in the case of the first configuration, a length of the path from the first filter 51 to the air conditioning unit 34 is longer than a length of the path from the second filter 52 to the air conditioning unit 34. In the case of the second configuration, a length of the path from the second filter 52 to the air conditioning unit 34 is longer than a length of the path from the first filter 51 to the air conditioning unit 34.

In the present invention, it is preferable to employ the first configuration among the first configuration and the second configuration. When the first configuration is employed, after removing large-size components (sands or dusts) is removed by the first filter 51 first, small-size components smaller than the large-size components removed by the first filter 51 (fine particles, gas, chemicals) can be removed by the second filter 52. Thus, excellent filtration performance can be stably provided.

FIG. 3 to FIG. 14 show examples relating to the configurations of the filter device 50 and the filter changing mechanism 60. Each of the examples will be described below. However, the configurations of the filter device 50 and the filter changing mechanism 60 are not limited to the following examples.

First Example

FIG. 3 shows a first example of the configurations of the filter device 50 and the filter changing mechanism 60. In the first example, the filter device 50 is arranged so that a lower surface of the filter device 50 faces the outside air intake portion 30. The first filter 51 and the second filter 52 are arranged side by side in the front-rear direction. However, the first filter 51 and the second filter 52 may be arranged side by side in the vehicle width direction.

The lower surface of the first filter 51 and the lower surface of the second filter 52 are supported by a ventilation plate 33. A partition plate 45A is arranged between the first filter 51 and the second filter 52. The partition plate 45A separates the first filter 51 and the second filter 52 from each other. The partition plate 45A extends upward from an intermediate portion of the ventilation plate 33 in the front-rear direction. The upper end portion of the partition plate 45A is located above the first filter 51 and the second filter 52. However, the upper end portion of the partition plate 45A does not reach the upper plate portion 15a of the outer roof 15. And, a space S4 is formed between the partition plate 45A and the upper plate portion 15a.

A flow straightening plate 46 is provided on an upper portion of the partition plate 45A. The flow straightening plate 46 extends forward from the upper portion of the partition plate 45A above the first filter 51. A space S5 is formed between the flow straightening plate 46 and the upper plate portion 15a. The space S5 is communicated with the space S4.

The filter changing mechanism 60 is configured to be selectively switched between a first state and a second state, the first state allowing the outside air to pass through only the first filter 51, the second state allowing the outside air to pass through only the second filter 52. The filter changing mechanism 60 has a movable member 61A configured to be movable.

The movable member 61A has a support shaft 62A and a swing plate 63A. The support shaft 62A is arranged at an intermediate position between the first filter 51 and the second filter 52 in the front-rear direction. The axis of the support shaft 62A extends in the vehicle width direction, and is rotatable about the axis. The rotation of the support shaft 62A can be performed by the manual operation or the driving of an actuator (for example, an electric motor). The support shaft 62A is supported by a bearing 64A arranged on the ventilation plate 33. Meanwhile, in the case where the first filter 51 and the second filter 52 are arranged side by side in the vehicle width direction, the support shaft 62A is arranged at an intermediate position between the first filter 51 and the second filter 52 in the vehicle width direction. Thus, the axial direction of the support shaft 62A corresponds to the front-rear direction.

The swing plate 63A is a non-ventilation plate, and constitutes a blocking portion 65A configured to block the outside air from flowing toward the filter device 50. One end portion of the swing plate 63A is attached to the support shaft 62A, and the swing plate 63A swings about the support shaft 62A in synchronization with rotation of the support shaft 62A. The swing motion of the swing plate 63A moves the blocking portion 65A to the first position PA1 and to the second position PA2.

The filter changing mechanism 60 is switched to the first state when the blocking portion 65A is in the first position PA1, and is switched to the second state when the blocking portion 65A is in the second position PA2. In particular, when the blocking portion 65A is in the first position PA1, the flow of the outside air toward the second filter 52 is blocked, and the flow of the outside air toward the first filter 51 is allowed. That is, the filter changing mechanism 60 will be in the first state in which the outside air is allowed to pass through only the first filter 51. When the blocking portion 65A is in the second position PA2, the flow of the outside air toward the first filter 51 is blocked, and the flow of the outside air toward the second filter 52 is allowed. That is, the filter changing mechanism 60 will be in the second state in which the outside air is allowed to pass through only the second filter 52.

Under the first state in which the blocking portion 65A is in the first position PA1, the outside air taken from the outside air intake portion 30 into the second space S2 passes through only the first filter 51, flows along the lower surface of the flow straightening plate 46 (refer to an arrowed line A1), is introduced from the first opening portion 41 into the first space S1, and then is supplied to the air conditioning unit 34. In this manner, the outside air that has passed through only the first filter 51 is supplied to the air conditioning unit 34.

Under the second state where the blocking portion 65A is in the second position PA2, the outside air taken from the outside air intake portion 30 into the second space S2 passes through only the second filter 52, flows from the space S4 into the space S5, flows along an upper surface of the flow straightening plate 46 (refer to an arrowed line A2), is introduced from the first opening portion 41 into the first space S1, and then is supplied to the air conditioning unit 34. In this manner, the outside air that has passed through only the second filter 52 is supplied to the air conditioning unit 34.

As described above, the filter changing mechanism 60 according to the first example is configured to be switched between the first state and the second state by the operation of moving the single blocking portion 65A (the swing plate 63A) to the first position PA1 and to the second position PA2.

Second Example

Figure 4:
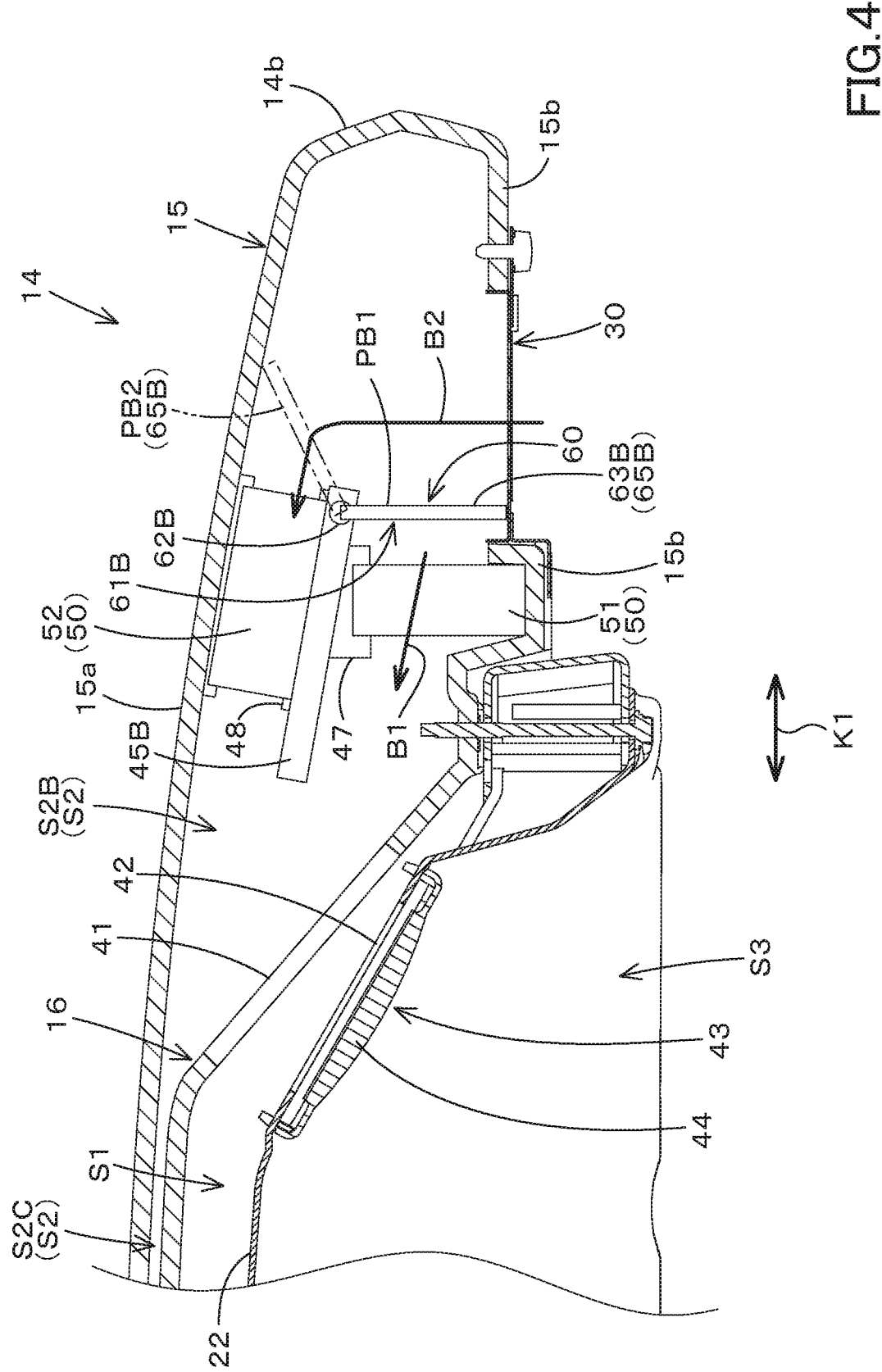
FIG. 4 is a view illustrating a vertical cross section of configurations of a filter device and a filter changing mechanism according to a second example of the present embodiment.

FIG. 4 shows a second example relating to the configurations of the filter device 50 and the filter changing mechanism 60. In the second example, the filter device 50 is arranged at a position separated away from the outside air intake portion 30 (a position not opposed to the outside air intake portion 30). In particular, the first filter 51 and the second filter 52 are arranged in front of the outside air intake section 30 in the rear space S2B. The first filter 51 is arranged on the lower plate portion 15b of the rear protruding portion 14b of the outer roof 15. The second filter 52 is arranged above the first filter 51 along the lower surface of the upper plate portion 15a of the outer roof 15. In this manner, the first filter 51 and the second filter 52 are arranged side by side in the vertical direction. Meanwhile, in the case of the present example, the second filter 52 is arranged above the first filter 51. However, the first filter 51 may be arranged above the second filter 52.

A partition plate 45B is arranged between the first filter 51 and the second filter 52. The partition plate 45B extends in the front-rear direction between the first filter 51 and the second filter 52. A first support member 47 for supporting an upper portion of the first filter 51 is provided at a lower portion of the partition plate 45B. A second support member 48 for supporting a lower portion of the second filter 52 is provided on an upper portion of the partition plate 45B.

The filter changing mechanism 60 is configured to be selectively switched between a first state and a second state, the first state allowing the outside air to pass through only the first filter 51, the second state allowing the outside air to pass through only the second filter 52. The filter changing mechanism 60 has a movable member 61B configured to be movable.

The movable member 61B has a support shaft 62B and a swing plate 63B. The support shaft 62B is supported on a rear portion of the partition plate 45B by a bearing. The axis of the support shaft 62B extends in the vehicle width direction, and the support shaft 62B is rotatable about the axis.

The swing plate 63B is a non-ventilation plate, and constitutes a blocking portion 65B configured to block the outside air from flowing toward the filter device 50. One end portion of the swing plate 63B is attached to the support shaft 62B, and the swing plate 63B swings about the support shaft 62B in synchronization with rotation of the support shaft 62B. The swing motion of the swing plate 63B moves the blocking portion 65B to the first position PB and to the second position PB2.

The filter changing mechanism 60 is switched to the first state when the blocking portion 65B is in the first position PB1, and is switched to the second state when the blocking portion 65B is in the second position PB2. In particular, when the blocking portion 65B is in the first position PB1, the flow of the outside air toward the second filter 52 is blocked, and the flow of the outside air toward the first filter 51 is allowed. That is, the filter changing mechanism 60 will be in the first state in which the outside air is allowed to pass through only the first filter 51. When the blocking portion 65B is in the second position PB2, the flow of the outside air toward the first filter 51 is blocked, and the flow of the outside air toward the second filter 52 is allowed. That is, the filter changing mechanism 60 will be in the second state in which the outside air is allowed to pass through only the second filter 52.

Under the first state in which the blocking portion 65B is in the first position PB1, the outside air taken from the outside air intake portion 30 into the second space S2 passes through only the first filter 51, flows forward (refer to an arrowed line B1), is introduced from the first opening portion 41 into the first space S1, and then is supplied to the air conditioning unit 34. In this manner, the outside air that has passed through only the first filter 51 is supplied to the air conditioning unit 34.

Under the second state where the blocking portion 65B is in the second position PB2, the outside air taken from the outside air intake portion 30 into the second space S2 passes through only the second filter 52, flows forward (refer to an arrowed line B2), is introduced from the first opening portion 41 into the first space S1, and then is supplied to the air conditioning unit 34. In this manner, the outside air that has passed through only the second filter 52 is supplied to the air conditioning unit 34.

As described above, the filter changing mechanism 60 according to the second example is configured to be switched between the first state and the second state by the operation of moving the single blocking portion 65B (the swing plate 63B) to the first position PB1 and to the second position PB2.

Third Example

Figure 5:
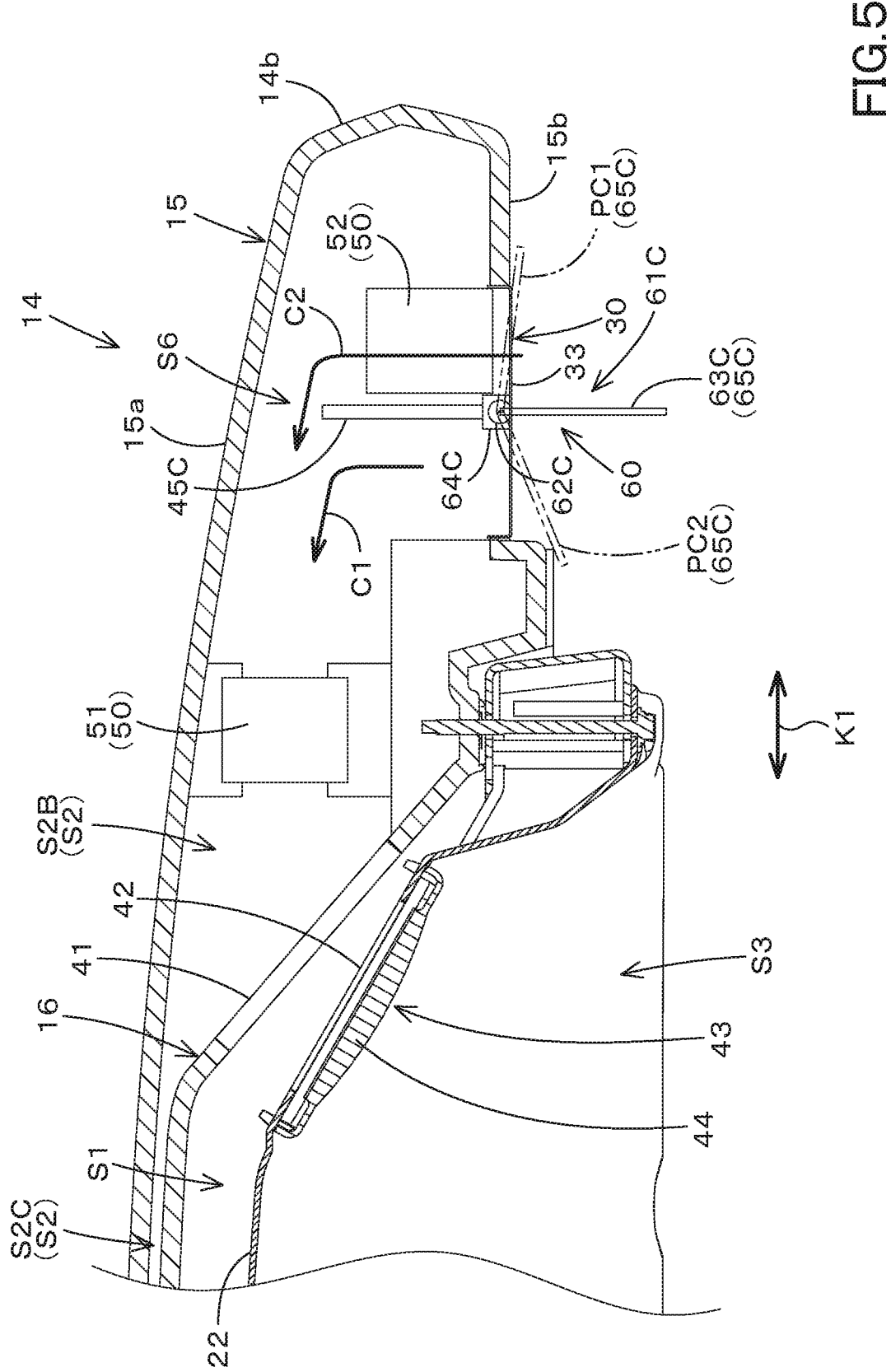
FIG. 5 is a view illustrating a vertical cross section of configurations of a filter device and a filter changing mechanism according to a third example of the present embodiment.

FIG. 5 shows a third example relating to the configurations of the filter device 50 and the filter changing mechanism 60. In the third example, the first filter 51 is arranged at a position separated away from the outside air intake portion 30 (a position not opposed to the outside air intake portion 30). The second filter 52 is arranged at a position opposed to the outside air intake portion 30. In particular, the first filter 51 is arranged in front of the outside air intake portion 30 in the rear space S2B. The second filter 52 is arranged above a rear portion of the ventilation plate 33 covering the outside air intake portion 30.

A partition plate 45C is arranged between the first filter 51 and the second filter 52. The partition plate 45C extends upward from an intermediate portion of the ventilation plate 33 in front of the second filter 52 in the front-rear direction. An upper end portion of the partition plate 45C is located above the second filter 52, but does not reach the upper plate portion 15a of the outer roof 15. And, a space S6 is formed between the partition plate 45C and the upper plate portion 15a.

The filter changing mechanism 60 is configured to be selectively switched between a first state and a second state, the first allowing the outside air to pass through only the first filter 51, the second state allowing the outside air to pass through both of the first filter 51 and the second filter 52.

The filter changing mechanism 60 has a movable member 61C configured to be movable. The movable member 61C has a support shaft 62C and a swing plate 63C. The support shaft 62C is arranged in front of the second filter 52. The axis of the support shaft 62C extends in the vehicle width direction, and the support shaft 62C is rotatable about the axis. The support shaft 62C is supported by a bearing 64C arranged on the ventilation plate 33.

The oscillating plate 63C is a non-ventilation plate, and constitutes a blocking portion 65C configured to block the outside air from flowing toward the filter device 50. One end portion of the swing plate 65C is attached to the support shaft 62C, and the swing plate 65C swings about the support shaft 62C in synchronization with rotation of the support shaft 62C. The swing motion of the swing plate 63C moves the blocking portion 65C to the first position PC1 and to the second position PC2.

The filter changing mechanism 60 is switched to the first state when the blocking portion 65C is in the first position PC1, and is switched to the second state when the blocking portion 65C is in the second position PC2. In particular, when the blocking portion 65C is in the first position PC1, the flow of the outside air toward the second filter 52 is blocked, and then the flow of the outside air toward the first filter 51 is allowed. That is, the filter changing mechanism 60 will be in the first state in which the outside air is allowed to pass through only the first filter 51. When the blocking portion 65C is in the second position, the flow of the outside air toward the first filter 51 and the flow of the outside air toward the second filter 52 are allowed. That is, the filter changing mechanism 60 will be in the second state in which the outside air is allowed to pass through both of the first filter 51 and the second filter 52.

Under the first state in which the blocking portion 65C is in the first position PC1, the outside air taken from the outside air intake portion 30 into the second space S2 flows along a front face of the partition plate 45C (refer to an arrowed line C1), is introduced from the first opening portion 41 into the first space S1 after passing through only the first filter 51, and then is supplied to the air conditioning unit 34. In this manner, the outside air having passed through only the first filter 51 is supplied to the air conditioning unit 34.

Under the second state where the blocking portion 65C is in the second position PC2, the outside air taken from the outside air intake portion 30 into the second space S2 passes through the second filter 52, passes over the partition plate 45C, passes through the space S6, and then flows forward (refer to an arrowed line C2). After having passed through the first filter 51, the outside air having flown forward is introduced from the first opening portion 41 into the first space S1, and then is supplied to the air conditioning unit 34. In this manner, the outside air having passed through the first filter 51 and the second filter 52 is supplied to the air conditioning unit 34.

In the third example, the second filter 52 is arranged on an upstream side (a side close to the outside air intake portion 30) in the flow direction of the outside air, and the first filter 51 is arranged on the downstream side (a side close to the air conditioning unit 34) in the flow direction of the outside air. In this manner, when the filter changing mechanism 60 is in the second state, the outside air taken in from the outside air intake portion 30 passes through the second filter 52 and the first filter 51 in this order.

As a modified example of the third example, the arrangement of the first filter 51 and the second filter 52 may be transposed. That is, the first filter 51 may be arranged on the upstream side in the flow direction of the outside air, and the second filter 52 may be arranged on the downstream side in the flow direction of the outside air. In that case, when the filter changing mechanism 60 is in the second state, the outside air taken from the outside air intake portion 30 passes through the first filter 51 and the second filter 52 in this order.

As described above, the filter changing mechanism 60 according to the third example is configured to be switched between the first state and the second state by the operation of moving the single blocking portion 65C (the swing plate 63C) to the first position PC1 and to the second position PC2.

Fourth Example

Figure 6:
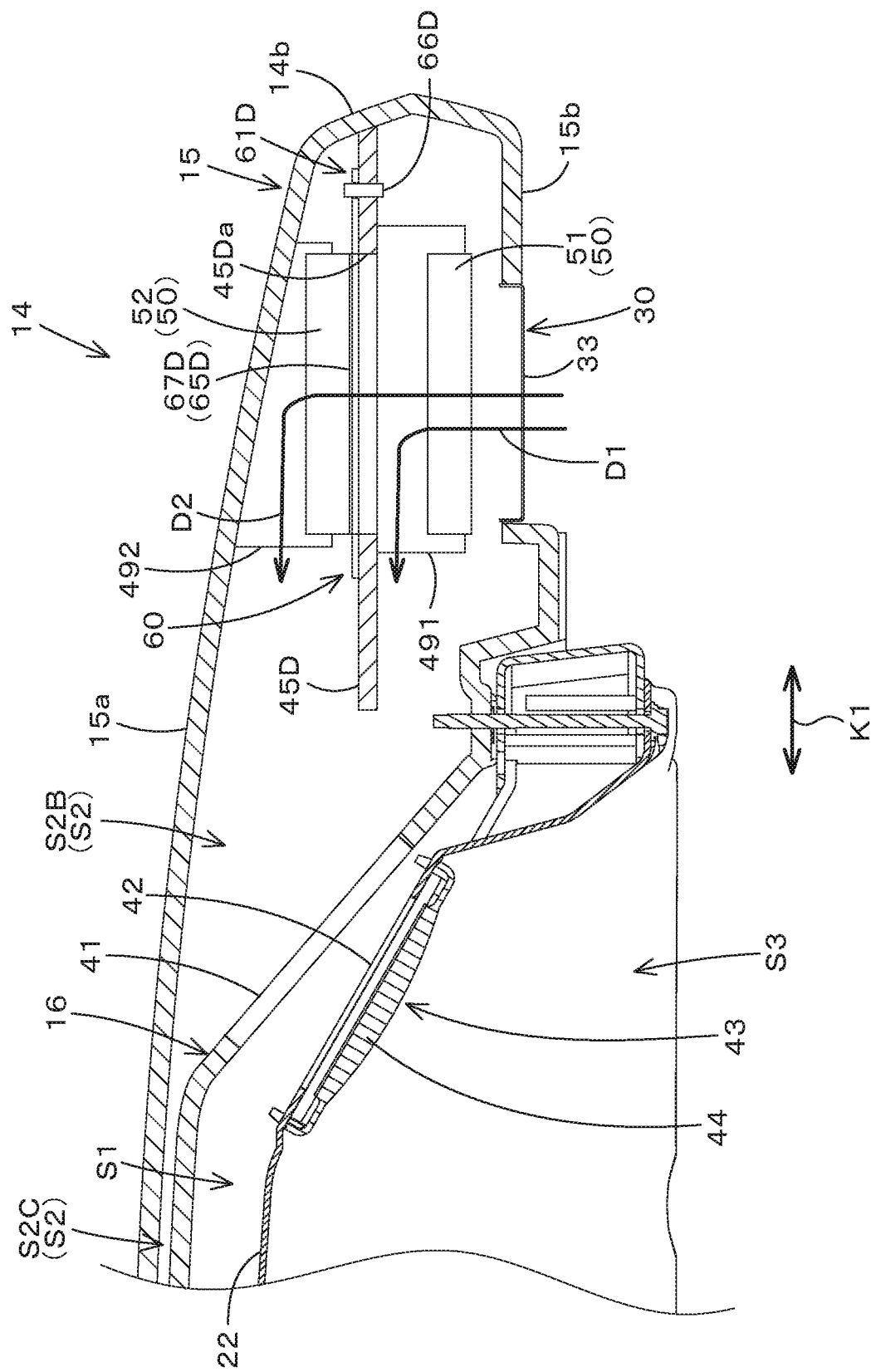
FIG. 6 is a view illustrating a vertical cross section of configurations of a filter device and a filter changing mechanism according to a fourth example of the present embodiment.

FIG. 6 and FIG. 7 show a fourth example relating to the configurations of the filter device 50 and the filter changing mechanism 60. In the fourth example, the filter device 50 is arranged above the outside air intake portion 30. The first filter 51 and the second filter 52 are arranged side by side in the vertical direction. The second filter 52 is arranged above the first filter 51.

A partition plate 45D is arranged between the first filter 51 and the second filter 52. The partition plate 45D extends in the front-rear direction in the rear space S2B. The first filter 51 is supported by a support member 491 on a lower portion of the partition plate 45D. The second filter 52 is supported on the partition plate 45D by a support member 492. A through hole 45Da is formed in the partition plate 45D. The through hole 45Da is arranged above the first filter 51 and below the second filter 52.

The filter changing mechanism 60 is configured to be selectively switched between a first state and a second state, the first state allowing the outside air to pass through only the first filter 51, the second state allowing the outside air to pass through both the first filter 51 and the second filter 52.

The filter changing mechanism 60 has a movable member 61D configured to be movable. The movable member 61D has a rotation shaft 66D and a rotating plate 67D. The axis of the rotation shaft 66D extends in the vertical direction, and the rotation shaft 66D is rotatable about the axis.

The rotating plate 67D is a non-ventilation plate, and constitutes a blocking portion 65D configured to block the outside air from flowing toward the filter device 50. The blocking portion 65D blocks the flow of the outside air toward the second filter 52. The rotating plate 67D is attached to the rotation shaft 66D, and rotates together with the rotation shaft 66D around the vertical axis. As shown in FIG. 7, due to the rotation of the rotating plate 67D, the blocking portion 65D moves to the first position PD1 and to the second position PD2. The blocking portion 65D shields the through hole 45Da when the blocking portion 65D is at the first position PD1, and does not shield the through hole 45Da when the blocking portion 65D is at the second position PD2.

The filter changing mechanism 60 is switched to the first state when the blocking portion 65D is at the first position PD1, and is switched to the second state when the blocking portion 65D is at the second position PD2. In particular, when the blocking portion 65D is at the first position PD1, the flow of the outside air toward the first filter 51 is allowed, but the flow of the outside air toward the second filter 52 is blocked. That is, the filter changing mechanism 60 is in the first state in which the outside air is allowed to pass through only the first filter 51. When the blocking portion 65D is at the second position PD2, the flow of the outside air toward the first filter 51 and the flow of the outside air toward the second filter 52 are allowed. That is, the filter changing mechanism 60 will be in the second state in which the outside air is allowed to pass through both of the first filter 51 and the second filter 52.

Under the first state where the blocking portion 65D is at the first position PD1, the outside air taken from the outside air intake portion 30 into the second space S2 passes only through the first filter 51, then flows forward along the partition plate 45D (refer to an arrowed line D1), is introduced from the first opening portion 41 into the first space S1, and then is supplied to the air conditioning unit 34. In this manner, the outside air having passed through only the first filter 51 is supplied to the air conditioning unit 34.

Under the second state where the blocking portion 65D is in the second position PD2, the outside air taken from the outside air intake portion 30 into the second space S2 passes through the first filter 51, then flows above the partition plate 45D through the through hole 45Da, and passes through the second filter 52 (refer to an arrowed line D2). The outside air having passed through the second filter 52 flows forward along a lower surface of the upper plate portion 15a, then is introduced from the first opening portion 41 into the first space S1, and is supplied to the air conditioning unit 34. In this manner, the outside air having passed through the first filter 51 and the second filter 52 is supplied to the air conditioning unit 34.

As described above, the filter changing mechanism 60 according to the fourth example is configured to be switched between the first state and the second state by the operation of moving the single blocking portion 65D (the swing plate 63D) to the first position PD1 and to the second position PD2.

Fifth Example

Figure 8:
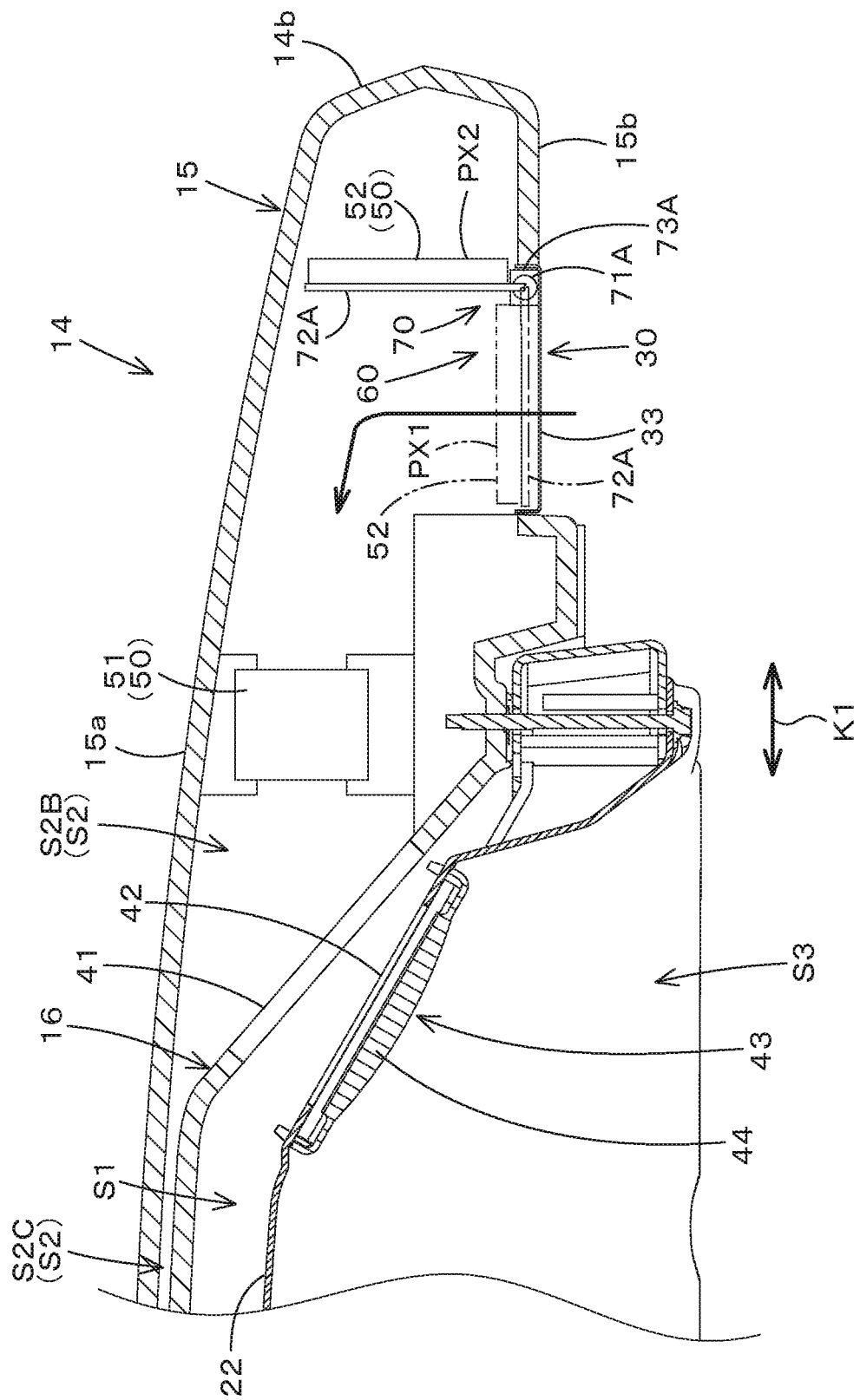
FIG. 8 is a view illustrating a vertical cross section of configurations of a filter device and a filter changing mechanism according to a fifth example of the present embodiment.

FIG. 8 shows a fifth example relating to the configurations of the filter device 50 and the filter changing mechanism 60. In the fifth example, the first filter 51 is arranged in front of the outside air intake portion 30 in the rear space S2B. The second filter 52 is arranged above the ventilation plate 33 covering the outside air intake portion 30.

The filter changing mechanism 60 is configured to be selectively switched between a first state and a second state, the first state allowing the outside air to pass through only the first filter 51, the second state allowing the outside air to pass through both of the first filter 51 and the second filter 52.

The filter changing mechanism 60 has a filter moving mechanism 70 configured to move the second filter 52 selectively between a ventilation position PX1 and the non-ventilation position PX2. The ventilation position PX1 is a position through which the outside air taken from the outside air intake portion 30 passes. The non-ventilation position PX2 is a position through which the outside air taken from the outside air intake portion 30 does not pass. In other words, the ventilation position PX1 is a position in the path from the outside air intake portion 30 to the first filter 51. The non-ventilation position PX2 is a position outside the path from the outside air intake portion 30 to the first filter 51.

The filter moving mechanism 70 has a drive shaft 71A and a moving plate 72A. The axis of the drive shaft 71A extends in the vehicle width direction, and the drive shaft 71A is rotatable about the axis. The rotation of the drive shaft 71A can be performed by the manual operation or the driving of an actuator (for example, an electric motor). The drive shaft 71A is supported by a bearing 73A arranged on a rear portion of the ventilation plate 33.

The moving plate 72A is constituted of a plate configured to allow ventilation, for example, constituted of a perforated plate or a mesh plate. A second filter 52 is attached to one surface (an upper surface) of the moving plate 72A. One end portion of the moving plate 72A is attached to the drive shaft 71A, and the moving plate 72A swings about the drive shaft 71A in synchronization with the drive shaft 71A. The moving plate 72A is swung to move the second filter 52 between the ventilation position PX1 and the non-ventilation position PX2.

When the second filter 52 is in the ventilation position PX1, the second filter 52 is in a position opposed to the outside air intake portion 30. Thus, the air taken from the outside air intake portion 30 passes through the second filter 52. When the second filter 52 is in the non-ventilation position, the second filter 52 is positioned at the rear of the outside air intake portion 30, and is located at a position outside the flow passage of the outside air from the outside air intake portion 30 to the air conditioning unit 34. Thus, the air taken from the outside air intake portion 30 does not pass through the second filter 52.

The filter changing mechanism 60 is switched to the first state when the second filter 52 is in the non-ventilation position PX2, and is switched to the second state when the second filter 52 is in the ventilation position PX1. In particular, when the second filter 52 is at the non-ventilation position, the outside air taken from the outside air intake portion 30 passes through only the first filter 51 without passing through the second filter 52. That is, the filter changing mechanism 60 will be in the first state in which the outside air is allowed to pass through only the first filter 51. When the second filter 52 is at the ventilation position, the outside air taken from the outside air intake portion 30 passes through the second filter 52 and then passes through the first filter 51. That is, the filter changing mechanism 60 will be in the second state in which the outside air is allowed to pass through both of the first filter 51 and the second filter 52.

In the first state where the second filter 52 is at the non-ventilation position PX2, the outside air taken from the outside air intake portion 30 into the second space S2 flows through the front side of the second filter 52 (through the air conditioning unit 34 side), passes through only the first filter 51, is introduced from the first opening portion 41 into the first space S1, and then is supplied to the air conditioning unit 34. In this manner, the outside air having passed through only the first filter 51 is supplied to the air conditioning unit 34.

In the second state where the second filter 52 is at the ventilation position PX1, the outside air taken from the outside air intake portion 30 into the second space S2 flows forward passing through the second filter 52. After having passed through the first filter 51, the outside air having flown forward is introduced from the first opening portion 41 into the first space S1, and then is supplied to the air conditioning unit 34. In this manner, the outside air having pass through both of the first filter 51 and the second filter 52 is supplied to the air conditioning unit 34.

As described above, the filter changing mechanism 60 according to the fifth example is configured to be switched between the first state and the second state by the operation of moving the second filter 52 to the ventilation position PX1 and to the non-ventilation position PX2.

Sixth Example

Figure 9:
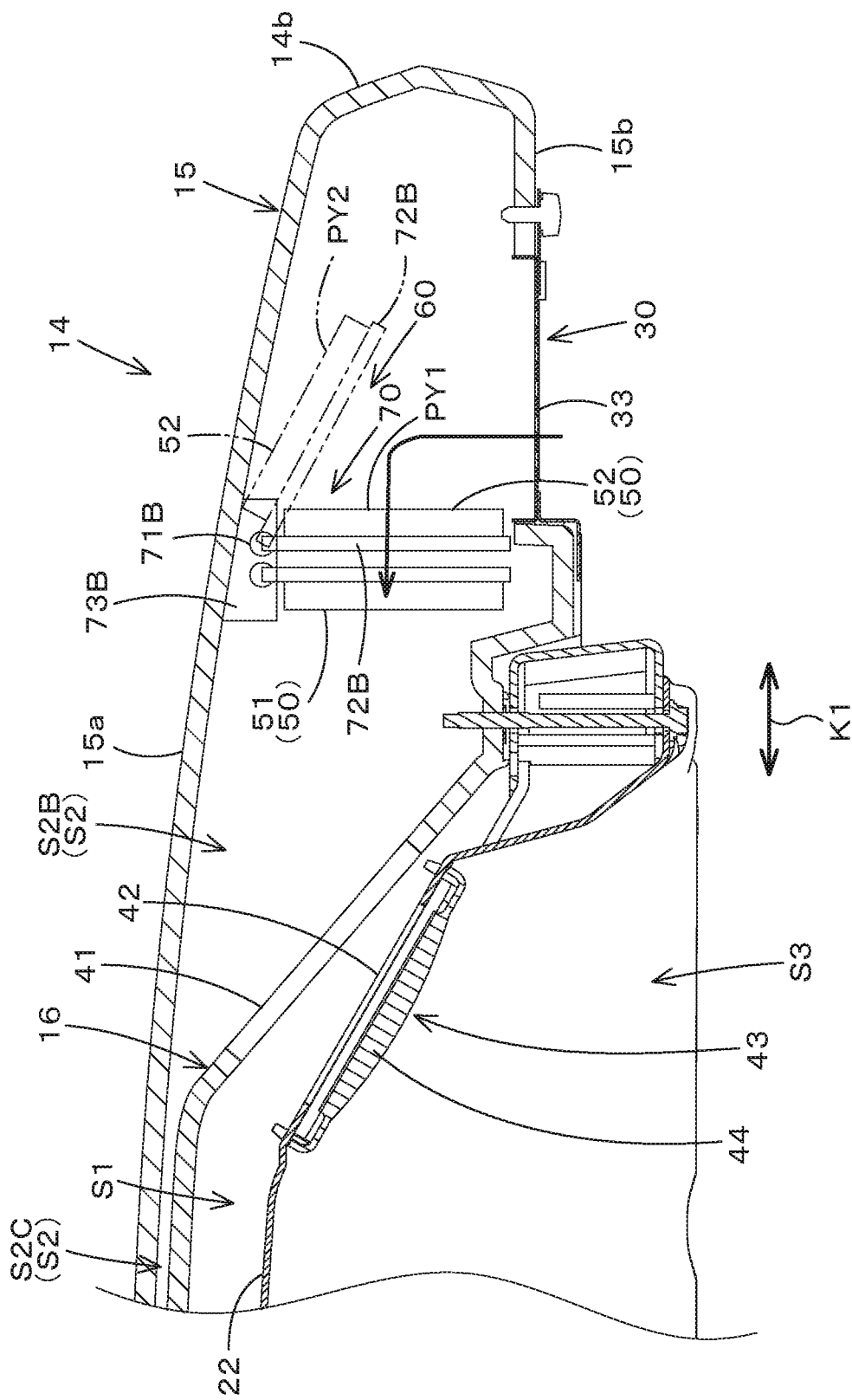
FIG. 9 is a view illustrating a vertical cross section of configurations of a filter device and a filter changing mechanism according to a sixth example of the present embodiment.

FIG. 9 shows a sixth example relating to the configurations of the filter device 50 and the filter changing mechanism 60. In the sixth example, the first filter 51 and the second filter 52 are arranged in front of the outside air intake portion 30 in the rear space S2B. The first filter 51 is arranged in front of the second filter 52.

The filter changing mechanism 60 is configured to be selectively switched between a first state and a second state, the first state allowing the outside air to pass through only the first filter 51, the second state allowing the outside air to pass through both of the first filter 51 and the second filter 52.

The filter changing mechanism 60 has a filter moving mechanism 70 configured to move the second filter 52 selectively between the ventilation position PY1 and the non-ventilation position PY2. The meanings of the ventilation position PY1 and the non-ventilation position PY2 are the same as the meanings of the ventilation position PX1 and the non-ventilation position PX2 described above.

The filter moving mechanism 70 has a drive shaft 71B and a moving plate 72B. The axis of the drive shaft 71B extends in the vehicle width direction, and is rotatable about the axis. The rotation of the drive shaft 71B can be performed by the manual operation or the driving of an actuator (for example, an electric motor). The drive shaft 71B is supported by a bearing 73B attached to the lower surface of the upper plate portion 15a of the outer roof 15.

The moving plate 72B is constituted of a plate configured to allow ventilation, for example, constituted of a perforated plate or a mesh plate. A second filter 52 is attached to one surface (a front surface) of the moving plate 72B. One end portion of the moving plate 72B is attached to the drive shaft 71B, and the moving plate 72B swings about the drive shaft 71B in synchronization with the drive shaft 71B. The moving plate 72B is swung to move the second filter 52 between the ventilation position PY1 and the non-ventilation position PY2.

When the second filter 52 is at the ventilation position PY1, the second filter 52 is located in the flow path of the outside air from the outside air intake portion 30 to the air conditioning unit 34. Thus, the air taken from the outside air intake portion 30 passes through the second filter 52. When the second filter 52 is at the non-ventilation position PY2, the second filter 52 is located at a position outside the flow path of the outside air from the outside air intake portion 30 to the air conditioning unit 34. Thus, the air taken from the outside air intake portion 30 does not pass through the second filter 52.

In addition, when the second filter 52 is at the ventilation position PY1, the second filter 52 is arranged side by side with the first filter 51 in the front-rear direction, and when the second filter 52 is at the non-ventilation position PY2, the second filter 52 is not arranged side by side with the first filter 51 in the front-rear direction.

The filter changing mechanism 60 is switched to the first state when the second filter 52 is at the non-ventilation position PY2, and is switched to the second state when the second filter 52 is at the ventilation position PY1. In particular, when the second filter 52 is at the non-ventilation position, the outside air taken from the outside air intake portion 30 passes through only the first filter 51 without passing through the second filter 52. That is, the filter changing mechanism 60 will be in the first state in which the outside air is allowed to pass through only the first filter 51. When the second filter 52 is at the ventilation position, the outside air taken from the outside air intake portion 30 passes through the second filter 52 and then passes through the first filter 51. That is, the filter changing mechanism 60 will be in the second state in which the outside air is allowed to pass through both of the first filter 51 and the second filter 52.

In the first state where the second filter 52 is at the non-ventilation position PY2, the outside air taken from the outside air intake portion 30 into the second space S2 flows through the front side of the second filter 52 (through the air conditioning unit 34 side), passes through only the first filter 51, is introduced from the first opening portion 41 into the first space S1, and then is supplied to the air conditioning unit 34. In this manner, the outside air having passed through only the first filter 51 is supplied to the air conditioning unit 34.

In the second state where the second filter 52 is at the ventilation position PY1, the outside air taken from the outside air intake portion 30 into the second space S2 flows forward passing through the second filter 52. After having passed through the first filter 51, the outside air having flown forward is introduced from the first opening portion 41 into the first space S1, and then is supplied to the air conditioning unit 34. In this manner, the outside air having pass through both of the first filter 51 and the second filter 52 is supplied to the air conditioning unit 34.

Meanwhile, in the sixth example, the arrangement of the first filter 51 and the second filter 52 may be transposed. That is, the first filter 51 may be arranged on the upper stream side than (backward from) the second filter 52 in the flow direction of the outside air. In that case, the position of the first filter 51 is fixed, and the second filter 52 is configured to be selectively moved between the ventilation position and the non-ventilation position by the filter changing mechanism 60.

As described above, the filter changing mechanism 60 according to the sixth example is configured to be switched between the first state and the second state by the operation of moving the second filter 52 to the ventilation position PY1 and to the non-ventilation position PY2.

Seventh Example

Figure 10:
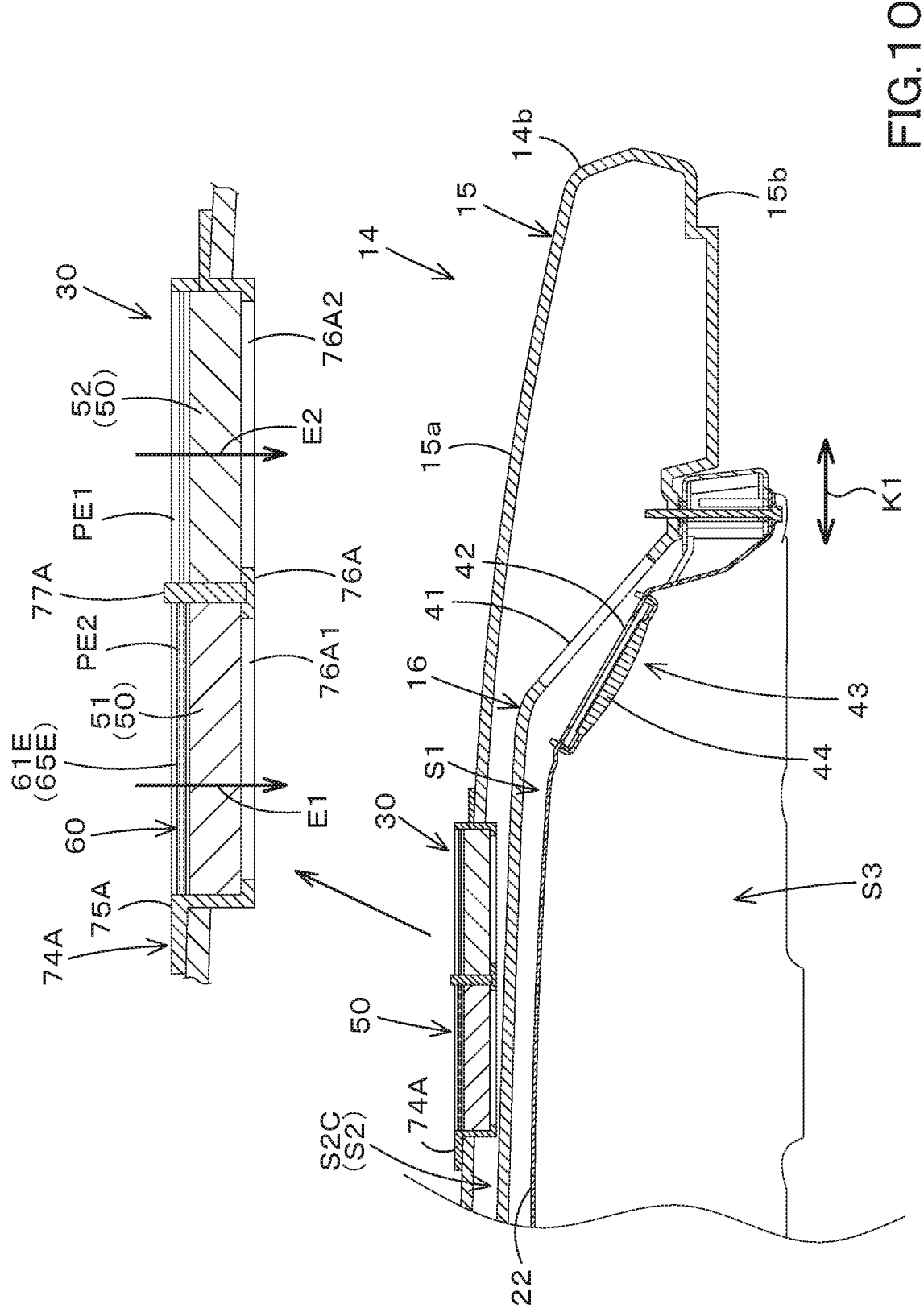
FIG. 10 is a view illustrating a vertical cross section of configurations of a filter device and a filter changing mechanism according to a seventh example of the present embodiment.
Figure 11:
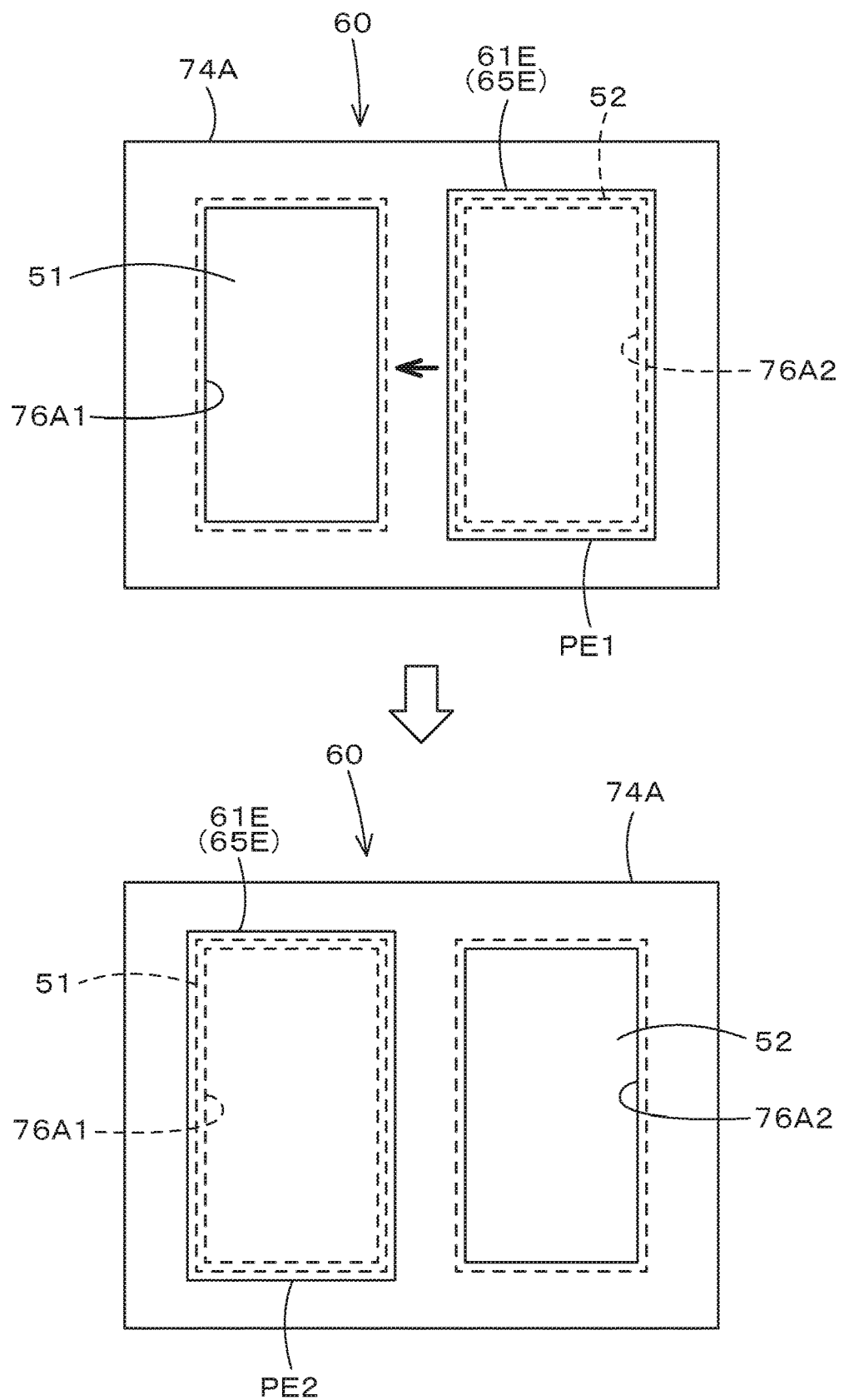
FIG. 11 is a plan view illustrating a state where a blocking portion moves from a first position to a second position according to the seventh example.

FIG. 10 and FIG. 11 show a seventh example of the configurations of the filter device 50 and the filter changing mechanism 60. In the case of the first example to the sixth example described above, the outside air intake portion 30 is provided on the lower plate portion 15b of the rear protruding portion 14b of the roof 14. However, in the seventh example, the outside air intake portion 30 is provided on the upper plate portion 15a of the roof 14.

In the seventh example, the filter device 50 is arranged in the outside air intake portion 30. The first filter 51 and the second filter 52 are arranged side by side in the front-rear direction. However, the first filter 51 and the second filter 52 may be arranged side by side in the vehicle width direction.

The first filter 51 and the second filter 52 are attached to an attachment member 74A that is attached to the outside air intake portion 30. The attachment member 74A has a fixing portion 75A, a support portion 76A, and a partition wall portion 77A. The fixing portion 75A is fixed to the upper plate portion 15a of the outer roof 15 by a fixing tool such as a bolt. The support portion 76A supports the first filter 51 and the second filter 52 from below. The partition wall portion 77A separates the first filter 51 and the second filter 52 from each other.

A first hole 76A1 and a second hole 76A2 are formed in the support portion 76A. The first hole 76A1 is arranged below the first filter 51, through which the outside air having passed through the first filter 51 passes toward the second space S2. The second hole 76A2 is arranged below the second filter 52, through which the outside air that has passed through the second filter 52 passes toward the second space S2.

The filter changing mechanism 60 is configured to be selectively switched between a first state and a second state, the first state allowing the outside air to pass through only the first filter 51, the second state allowing the outside air to pass through only the second filter 52. The filter changing mechanism 60 has a movable member 61E configured to be movable.

The movable member 61E is constituted of a slide plate configured to slide. Hereinafter, the movable member 61E is also referred to as "a slide plate 61E". The slide plate 61E is movable in an arrangement direction of the first filter 51 and the second filter 52 (in the front-rear direction). Movement of the slide plate 61E can be performed by the manual operation or the driving of an actuator (a cylinder, a linear motor, and the like). The slide plate 61E can be moved, for example, along a groove formed on the inner surface of the attachment member 74A in the front-rear direction.

The slide plate 61E is constituted of a non-ventilation plate, and constitutes a blocking portion 65E configured to block the flow of the outside air toward the filter device 50. As shown in FIG. 11, the slide plate 61E slides to move the blocking portion 65E between the first position PE1 and the second position PE2.

The filter changing mechanism 60 is switched to the first state when the blocking portion 65E is in the first position PE1, and is switched to the second state when the blocking portion 65E is in the second position PE2. In particular, when the blocking portion 65E is at the first position PE1, the second hole 76A2 is shielded so that the flow of the outside air towards the second filter 52 is blocked, and the flow of the outside air toward the first filter 51 is allowed. That is, the filter changing mechanism 60 is in the first state in which the outside air is allowed to pass through only the first filter 51. When the blocking portion 65E is in the second position PE2, the first hole 76A1 is shielded so that the flow of outside air toward the first filter 51 is blocked, and the flow of the outside air toward the second filter 52 is allowed. That is, the filter changing mechanism 60 will be in the second state in which the outside air is allowed to pass through only the second filter 52.

In the first state where the blocking portion 65E is at the first position PE1, the outside air taken from the outside air intake portion 30 passes through only the first filter 51, is introduced from the first hole 76A1 into the second space S2 (refer to an arrowed line E1), and then is supplied to the air conditioning unit 34. In this manner, the outside air having passed through only the first filter 51 is supplied to the air conditioning unit 34.

In the second state where the blocking portion 65E is in the second position PE2, the outside air taken from the outside air intake portion 30 passes through only the second filter 52, is introduced from the second hole 76A2 into the second space S2 (refer to an arrowed line E2), and then is supplied to the air conditioning unit 34. In this manner, the outside air that has passed through only the second filter 52 is supplied to the air conditioning unit 34.

As described above, the filter changing mechanism 60 according to the seventh example is configured to be switched between the first state and the second state by the operation of moving the single blocking portion 65E (the slide plate 61E) to the first position PE1 and to the second position PE2.

Eighth Example

Figure 12:
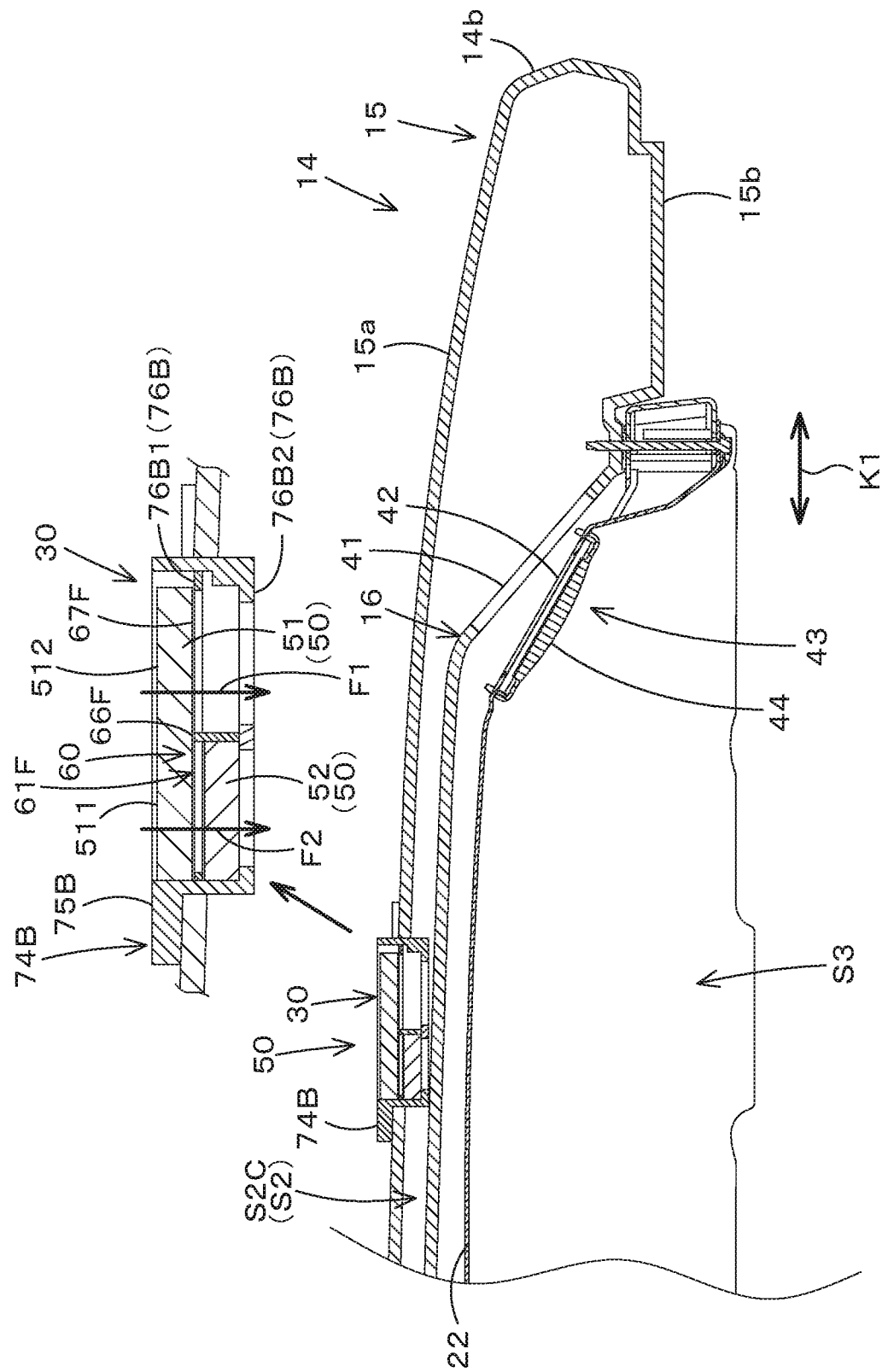
FIG. 12 is a view illustrating a vertical cross section of configurations of a filter device and a filter changing mechanism according to an eighth example of the present embodiment.

FIG. 12 and FIG. 13 show an eighth example relating to the configurations of the filter device 50 and the filter changing mechanism 60. In the case of the eighth example, the outside air intake portion 30 is provided on the upper plate portion 15a of the roof 14 as in the seventh example.

In the eighth example, the filter device 50 is arranged in the outside air intake portion 30. The first filter 51 and the second filter 52 are arranged side by side in the vertical direction. In particular, the first filter 51 is arranged above the second filter 52. In addition, the first filter 51 has an area larger than that of the second filter 52. The first filter 51 covers the upper portion of the second filter 52 and spreads over wider than the second filter 52. In other words, the first filter 51 has a first portion 511 below which the second filter 52 is located and a second portion 512 below which the second filter 52 is not located.

The first filter 51 and the second filter 52 are attached to an attachment member 74B that is attached to the outside air intake portion 30. The attachment member 74B has a fixing portion 75B and a support portion 76B. The fixing portion 75B is fixed to the upper plate portion 15a of the outer roof 15 by a fixing tool such as a bolt. The support portion 76B has a first support portion 76B1 and a second support portion 76B2. The first support portion 76B1 supports the first filter 51 from below. The second support portion 76B2 supports the second filter 52 from below under the first filter 51.

The filter changing mechanism 60 is configured to be selectively switched between a first state and a second state, the first state allowing the outside air to pass through only the first filter 51, the second state allowing the outside air to pass through both of the first filter 51 and the second filter 52.

The filter changing mechanism 60 has a movable member 61F configured to be movable. The movable member 61F has a rotation shaft 66F and a rotating plate 67F. The axis of the rotation shaft 66F extends in the vertical direction, and is rotatable about the axis. The rotation shaft 66F is supported by the supporting portion 76B so as to be rotatable.

As shown in FIG. 13, the rotating plate 67F has a ventilating portion 68F and a blocking portion 65F. The ventilation portion 68F is a hole having such a size and shape that only the first portion 511 of the first filter 51 or only the second portion 512 can be exposed. The blocking portion 65F is a portion that cannot perform the ventilation, and can block the flow of the outside air toward the filter device 50. When the ventilation portion 68F exposes the first portion 511, the blocking portion 65F shields the second portion 512 to block the flow of the outside air towards the second portion 512, and when the ventilating portion 68F exposes the second portion 512, the first portion 511 is shielded to block the flow of the outside air toward the first portion 511.

The rotating plate 67F is attached to the rotation shaft 66F, and is configured to rotate together with the rotation shaft 66F around the axis extending in the vertical direction. The rotation shaft 66F is located at the center of the rotating plate 67F. The rotation of the rotating plate 66F moves the blocking portion 65F to the first position PF1 and to the second position PF2. When the blocking portion 65F is at the first position PF1, the blocking portion 65F shields the first portion 511 of the first filter 51 and does not shield the second portion 512. In addition, when the blocking portion 65F is at the second position PF2, the blocking portion 65F shields the second portion 512 of the first filter 51 and does not shield the first portion 511.

The filter changing mechanism 60 is switched to the first state when the blocking portion 65F is at the first position PF1, and is switched to the second state when the blocking portion 65F is at the second position PF2. In particular, when the blocking portion 65F is at the first position PF1, the flow of the outside air toward the second portion 512 is allowed, but the flow of the outside air toward the first portion 511 is blocked. The outside air flowing toward the second portion 512 passes through only the first filter 51. That is, the filter changing mechanism 60 will be in the first state in which the outside air is allowed to pass through only the first filter 51. When the blocking portion 65F is at the second position PF2, the flow of the outside air toward the first portion 511 is allowed. The outside air flowing toward the first portion 511 passes through the first filter 51, passes through the ventilation portion 68F toward the second filter 52, and then passes through the second filter 52. That is, the filter changing mechanism 60 will be in the second state in which the outside air is allowed to pass through both of the first filter 51 and the second filter 52.

In the first state where the blocking portion 65F is at the first position PF1, the outside air taken from the outside air intake portion 30 passes through only the first filter 51, is introduced into the second space S2 (refer to an arrowed line F1 in FIG. 12), then is introduced from the first opening portion 41 into the first space S1, and is supplied to the air conditioning unit 34. In this manner, the outside air having passed through only the first filter 51 is supplied to the air conditioning unit 34.

In the second state where the blocking portion 65F is at the second position PF2, the outside air taken from the outside air intake portion 30 passes through both of the first filter 51 and the second filter 52, is introduced into the second space S2 (refer to an arrowed line F2 in FIG. 12), then is introduced from the first opening portion 41 into the first space S1, and is supplied to the air conditioning unit 34. In this manner, the outside air having passed through both of the first filter 51 and the second filter 52 is supplied to the air conditioning unit 34.

As described above, the filter changing mechanism 60 according to the eighth example is configured to be switched between the first state and the second state by the operation of moving the single blocking portion 65F (the rotating plate 67F) to the first position PF1 and to the second position PF2.

Ninth Example

Figure 14:
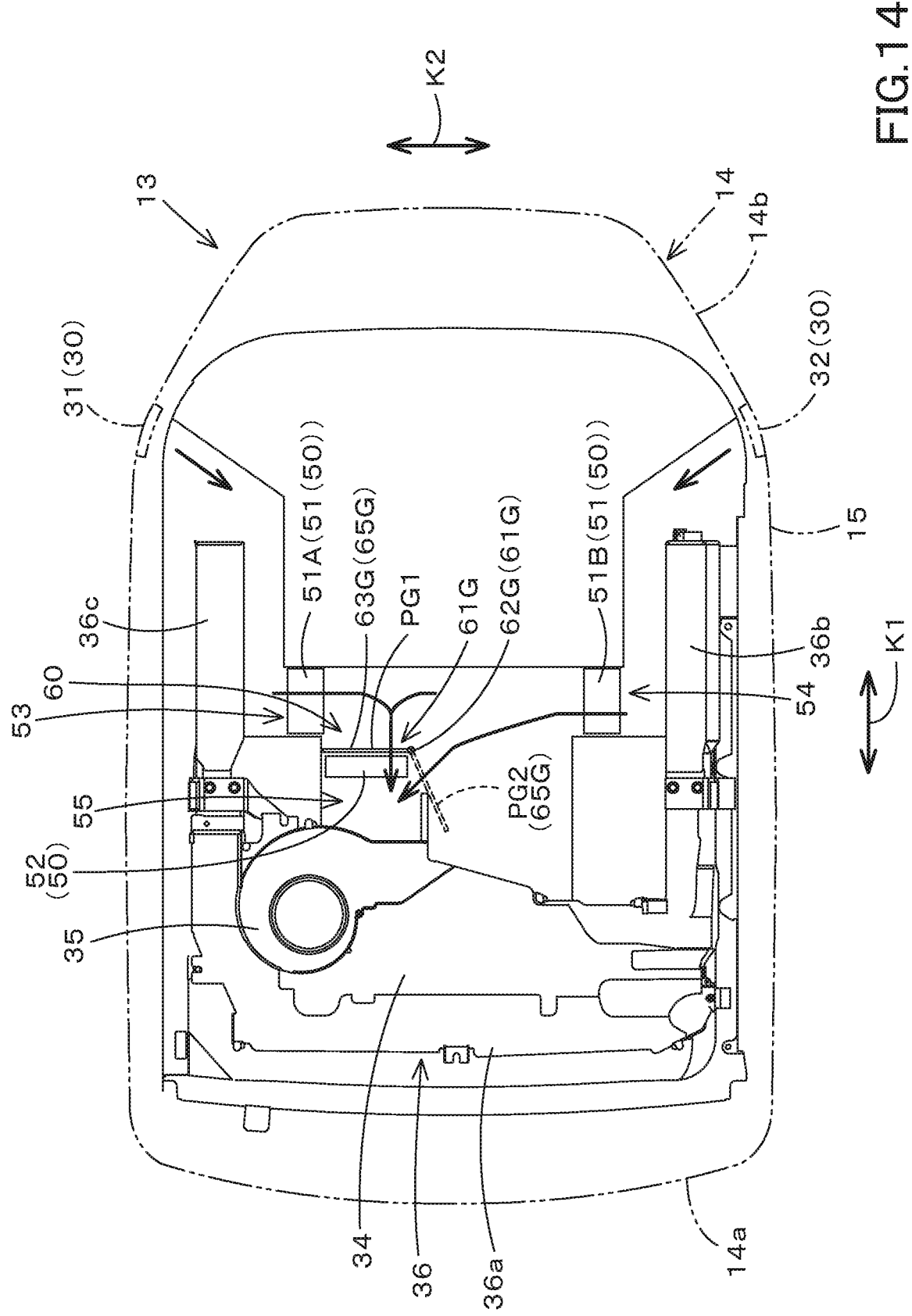
FIG. 14 is a plan view illustrating configurations of a filter device and a filter changing mechanism according to a ninth example of the present embodiment.

FIG. 14 shows a ninth example relating to the configurations of the filter device 50 and the filter changing mechanism 60. In the ninth example, two outside air intake portions 30 are provided. The outside air intake portions 30 include a first outside air intake portion 31 and a second outside air intake portion 32. The first outside air intake portion 31 is provided on one side (the left side) of the cabin 13 in the width direction (the same direction as the vehicle width direction K2). The second outside air intake portion 32 is provided on the other side (the right side) of the cabin 13 in the width direction. The first outside air intake portion 31 and the second outside air intake portion 32 are provided at the rear portion of the roof 14. The first outside air intake portion 31 is provided at the left rear portion of the outer roof 15. The second outside air intake portion 32 is provided on the right rear portion of the outer roof 15.

The first filter 51 includes a one-side filter 51A through which the outside air taken from the first outside air intake portion 31 passes and an other-side filter 51B through which the outside air taken from the second outside air intake portion 32 passes. The one-side filter 51A is arranged in a first passage 53 through which the outside air taken from the first outside air intake portion 31 and flowing toward the air conditioning unit 34 passes. The other-side filter 51B is arranged in a second passage 54 through which the outside air taken from the second outside air intake portion 32 and flowing toward the air conditioning unit 34 passes. The one-side filter 51A is arranged to the left from the center of the cabin 13 in the width direction. The other-side filter 51B is arranged to the right from the center of the cabin 13 in the width direction.

The second filter 52 is arranged on the downstream side (the side close to the air conditioning unit 34) in the flow direction of the outside air than the first filter 51. The first filter 51 is arranged on the upper stream side (the side close to the outside air intake portion 30) in the flow direction of the outside air than the second filter 52. In other words, the second filter 52 is arranged in the intermediate passage 55 through which the outside air having passed through the first filter 51 toward the air conditioning unit 34 passes. The intermediate passage 55 is located on the downstream side (the side close to the air conditioning unit 34) in the flow direction of the outside air than the first passage 53 and the second passage 54.

The filter changing mechanism 60 is configured to be selectively switched between a first state and a second state, the first state allowing the outside air to pass through only the first filter 51, the second state allowing the outside air to pass through both of the first filter 51 and the second filter 52.

The filter changing mechanism 60 has a movable member 61G configured to be movable.

The movable member 61G has a support shaft 62G and a swing plate 63G. The support shaft 62G is arranged in the intermediate passage 55. The axis of the support shaft 62G extends in the vertical direction, and is rotatable about the axis. Rotation of the support shaft 62G can be performed by the manual operation or the driving of an actuator.

The swing plate 63G is a non-ventilation plate, and constitutes a blocking portion 65G configured to block the flow of the outside air toward the filter device 50. One end portion of the swing plate 63G is attached to the support shaft 62G, and swings about the support shaft 62G in synchronization with the support shaft 62G. The swing motion of the swing plate 63G moves the blocking portion 65G to the first position PG1 and to the second position PG2.

The filter changing mechanism 60 is switched to be in the first state when the blocking portion 65G is at the first position PG1, and is switched to be in the second state when the blocking portion 65G is at the second position PG2. In particular, when the blocking portion 65G is at the first position PG1, the flow of the outside air toward the second filter 52 is blocked, and the flow of the outside air toward the first filter 51 is allowed. That is, the filter changing mechanism 60 will be in the first state in which the outside air is allowed to pass through only the first filter 51. When the blocking portion 65G is in the second position PG2, the flow of the outside air toward the first filter 51 and the flow of the outside air toward the second filter 52 are allowed. That is, the filter changing mechanism 60 will be in the second state in which the outside air is allowed to pass through both of the first filter 51 and the second filter 52.

Under the first state where the blocking portion 65G is at the first position PG1, the flow of the outside air toward the second filter 52 is blocked by the blocking portion 65G, so that the outside air taken from the outside air intake portion 30 (the first outside air intake portion 31 and the second outside air intake portion 32) passes through only the first filter 51 (the one-side filter 51A and the other-side filter 51B), and then is supplied to the air conditioning unit 34. In this manner, the outside air having passed through only the first filter 51 is supplied to the air conditioning unit 34.

Under the second state where the blocking portion 65G is at the second position PG2, the flow of the outside air toward the second filter 52 is not blocked by the blocking portion 65G, so that the outside air taken from the outside air intake portion 30 (the first outside air intake portion 31 and the second outside air intake portion 32) passes through the first filter 51 (the one-side filter 51A and the other-side filter 51B), then passes through the second filter 52, and is supplied to the air conditioning unit 34. In this manner, the outside air having passed through both of the first filter 51 and the second filter 52 is supplied to the air conditioning unit 34.

As described above, the filter changing mechanism 60 according to the ninth example is configured to be switched between the first state and the second state by the operation of moving the single blocking portion 65G (the swing plate 63G) to the first position PG1 and to the second position PG2.

<Effect>

According to the working vehicle 1 described above, the following effects are provided.

The working vehicle 1 includes: the cabin 13; and an outside air inlet portion 30 configured to take the outside air that is to be introduced to the cabin 13. The working vehicle 1 further includes comprises: a filter device 50 through which the outside air taken from the outside air inlet portion passes, having: a first filter 51 providing a first filtering level; and a second filter 52 providing a second filtering level that is a filtering level higher than the first filtering level; an air conditioning unit 34 to which the outside air having passed through the filter device 50 is supplied; and a filter changing mechanism 60 having: a first state to allow the outside air to pass through only the first filter 51; and a second state to allow the outside air to pass through at least the second filter 52 among the first filter 51 and the second filter 52, the filter changing mechanism 60 being configured to be selectively switched to the first state or the second state.

According to that configuration, the filter changing mechanism 60 is configured to be switched between a first state and a second state, the first state allowing the outside air to pass through only the first filter 51, the second state allowing the outside air to pass through at least the second filter 52 among the first filter 51 and the second filter 52. It is possible for the filter changing mechanism 60 to be selectively switched between the first state and the second state according to contents of the work (the medicine spray and the like), thereby it is possible to reliably exert the filtration performance corresponding to the contents of the work without exchanging the filter for each work content.

In addition, the filter changing mechanism 60 allows the outside air to pass through both of the first filter 51 and the second filter 52 under the second state.

According to this configuration, the filter changing mechanism 60 is configured to be switched reliably between a first state and a second state, the first state allowing the outside air to pass through only the first filter 51, the second state allowing the outside air to pass through both of the first filter 51 and the second filter 52. Thus, by setting the filter changing mechanism 60 in the first state, the dusts and the like contained in the outside air can be removed by the first filter 51. Further, by switching the filter changing mechanism 60 to the second state, it is possible to remove the dusts and the like contained in the outside air by the first filter 51, and remove the medicine or the like contained in the outside air by the second filter 52.

In addition, the filter changing mechanism 60 allows the outside air to pass through not the first filter 51 but the second filter 52 under the second state.

According to that configuration, the filter changing mechanism 60 is configured to be switched reliably between a first state and a second state, the first state allowing the outside air to pass through only the first filter 51, the second state allowing the outside air to pass through only the second filter 52. Thus, by switching the filter changing mechanism 60 to the first state, the dusts and the like contained in the outside air can be removed by the first filter 51. Further, by switching the filter changing mechanism 60 to the second state, it is possible to remove the dusts, the medicine, and the like contained in the outside air by the second filter 52.

In addition, the first filter 51 is arranged upper than the second filter 52 in a direction of stream of the outside air flowing from the outside air inlet portion 30 toward the air conditioning unit 34.

According to that configuration, after removing a large component (sands or dusts) in the first filter 51 first, components (fine particles, gas, chemicals) smaller than the large components removed by the first filter 51 can be removed by the second filter 52. Thus, excellent filtering performance can be stably provided. Further, it is possible to reduce the burden on the second filter having a high filtration level and to lengthen the service life.

In addition, the filter changing mechanism 60 includes: a blocking portion (65A to 65G) configured to block stream of the outside air flowing toward the filter device 50; and a movable member (61A to 61G) configured to move the blocking portion (65A to 65G) between a first position and a second position, wherein the first state is established when the blocking portion (65A to 65G) is moved to the first position, and wherein the second state is established when the blocking portion (65A to 65G) is moved to the second position.

According to that configuration, the switching operation between the first state and the second state by the filter changing mechanism 60 is performed by moving the movable members 61A to 61G to move the blocking portions 65A to 65G to the first position and to the second position. Thus, the switching operation between the first state and the second state can be easily and reliably performed.

In addition, the movable member (61A to 61C, 61G) includes: a support shaft (62A to 62C, 62G); and a swing plate (63A to 63C, 63G) configured to be swung about the support shaft (62A to 62C, 62G) to move the blocking portion (65A to 65C, 65G) between the first position and the second position.

According to that configuration, the switching between the first state and the second state can be surely performed by swinging the swing plates 63A to 63C, 63G while configuring the filter changing mechanism 60 in a compact size.

In addition, the movable member (61D, 61F) includes: a rotating shaft (66D, 66F); and a rotating plate (67D, 67F) configured to be rotated with the rotating shaft (66D, 66F) to move the blocking portion (65D, 65F) between the first position and the second position.

According to that configuration, it is possible for the filter changing mechanism 60 to be surely switched between the first state and the second state by rotating the rotating plates 67D, 67F while configuring the filter changing mechanism 60 in a compact size.

In addition, the movable member 61E is constituted of a slide plate 61E configured to be slid to move the blocking portion 65E between the first position and the second position.

According to that configuration, the switching between the first state and the second state can be surely performed by sliding movement of the slide plate 61E while configuring the thickness of the filter changing mechanism 60 to be small.

In addition, the filter changing mechanism 60 includes a filter moving mechanism 70 having: a ventilating position to allow the outside air to pass through the second filter 52; and a non-ventilating position to prevent the outside air from passing through the second filter 52, the filter moving mechanism 70 being configured to move the second filter 52 selectively between the ventilating position and the non-ventilating position.

According to that configuration, since the filter changing mechanism 60 can be switched between the first state and the second state by moving the second filter 51, the filter changing mechanism 60 can be switched between the first state and the second state, so that the filter changing mechanism 60 does not require a blocking portion configured to block the flow of the outside air toward the filter device 50.

In addition, the outside air inlet portion 30 includes: a first outside air inlet portion 31 arranged on one side of the cabin 13 in a width direction of the cabin 13; and a second outside air inlet portion 32 arranged on the other side of the cabin 13 in the width direction of the cabin 13, and wherein the first filter 51 includes: a one-side filter 51A through which the outside air taken from the first outside air inlet portion 31; and an other-side filter 51B through which the outside air taken from the second outside air inlet portion 32.

According to that configuration, the outside air is taken from the one side and the other side of the cabin 13 in the width direction, and the taken outside air is guided to the one side filter 51A and the other side filter 51B for filtration. Therefore, the filtration process by the first filter 51 can be distributed and efficiently performed.

In addition, a roof 14 is arranged on an upper portion of the cabin (13). The air conditioning unit (34) is arranged on a front portion of the roof (14). The filter device (50) is arranged on a rear portion of the roof (14).

According to that configuration, the outside air filtered by the filter device 50 arranged at the rear portion of the roof 14 of the cabin 13 can be supplied to the air conditioning unit 34 arranged at the front portion of the roof 14. Further, since the filter device 50 can be arranged at a position separated away from the air conditioning unit 34, it is possible to ensure a wide space where the filter device 50 can be installed.

In addition, a roof 14 is arranged on an upper portion of the cabin 13. The air conditioning unit 34 and the filter device 50 are arranged on a rear portion of the roof 14.

According to that configuration, since the air conditioning unit 34 and the filter device 50 can be arranged close to each other, the flow path of the outside air from the filter device 50 to the air conditioning unit 34 can be shortened.

In addition, the working vehicle includes an inside-air/outside-air changing mechanism 43 configured to change a ratio between the outside air and air in the cabin 13 in supplied air to the air conditioning unit 34. The filter device 50 is arranged upper than the inside-air/outside-air changing mechanism 43 in a direction of stream of the outside air flowing from the outside air inlet portion 30 toward the air conditioning unit 34.

According to that configuration, the outside air taken from the outside air intake portion 30 can be filtered by the filter device 50 on the upstream side of the inside-air/outside-air changing mechanism 43. Thus, it is possible to prevent the outside air not filtered by the filter device 50 from contacting the inside-air/outside-air changing mechanism 43.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

The invention claimed is:

1. A working vehicle comprising:
a cabin which has a roof; and
an outside air inlet portion configured to take outside air that is to be introduced to the cabin, characterized in that the working vehicle further comprises:
a filter device through which the outside air taken from the outside air inlet portion passes, having:
a first filter providing a first filtering level; and
a second filter providing a second filtering level that is a filtering level higher than the first filtering level;
an air conditioning unit to which the outside air having passed through the filter device is supplied; and
a filter changing mechanism having:
a first state to allow the outside air to pass through only the first filter; and
a second state to allow the outside air to pass through at least the second filter among the first filter and the second filter,
the filter changing mechanism being configured to be selectively switched to the first state or the second state,
wherein the filter changing mechanism includes:
a blocking portion configured to block stream of the outside air flowing toward the filter device; and
a movable member configured to move the blocking portion between a first position and a second position,
wherein the first state is established when the blocking portion is moved to the first position,
wherein the second state is established when the blocking portion is moved to the second position,
wherein the roof has an outer roof which constitutes an outer surface of the roof and an inner roof provided inside the outer roof,
wherein the outside air inlet portion is formed in the outer roof,
wherein a first space is formed between the inner roof and a ceiling plate constituting a ceiling of the cabin, and a second space is formed between the inner roof and the outer roof,
wherein the air conditioning unit is arranged in the first space, the filter device is arranged in the second space, and the first space and the second space are communicated with each other through a first opening portion,
wherein the outside air inlet portion includes:
a first outside air inlet portion arranged on one side of the cabin in a width direction of the cabin; and
a second outside air inlet portion arranged on the other side of the cabin in the width direction of the cabin,
wherein the first filter includes:
a one-side filter through which the outside air taken from the first outside air inlet portion passes; and an other-side filter through which the outside air taken from the second outside air inlet portion passes, wherein the one-side filter is arranged in a first passage through which the outside air taken from the first outside air inlet portion and flowing toward the air conditioning unit passes, wherein the other-side filter is arranged in a second passage through which the outside air taken from the second outside air inlet portion and flowing toward the air conditioning unit passes, wherein the second filter is arranged in an intermediate passage through which the outside air having passed through the first filter toward the air conditioning unit passes, wherein the intermediate passage is located on a downstream side in a flow direction of the outside air than the first passage and the second passage, and wherein, under the second state, the outside air having passed through the one-side filter and the other-side filter passes through the second filter.

2. The working vehicle according to claim 1,
wherein the filter changing mechanism allows the outside air to pass through both of the first filter and the second filter under the second state.

3. The working vehicle according to claim 2,
wherein the first filter is arranged upper than the second filter in a direction of stream of the outside air flowing from the outside air inlet portion toward the air conditioning unit.

4. The working vehicle according to claim 1,
wherein the movable member includes:
a support shaft; and
a swing plate configured to be swung about the support shaft to move the blocking portion between the first position and the second position.

5. The working vehicle according to claim 1,
wherein the movable member includes:
a rotating shaft; and
a rotating plate configured to be rotated with the rotating shaft to move the blocking portion between the first position and the second position.

6. The working vehicle according to claim 1, wherein the movable member includes a slide plate configured to be slid to move the blocking portion between the first position and the second position.

7. The working vehicle according to claim 1,
wherein the air conditioning unit is arranged on a front portion of the roof,
and wherein the filter device is arranged on a rear portion of the roof.

8. The working vehicle according to claim 1,
wherein the air conditioning unit and the filter device are arranged on a rear portion of the roof.

9. The working vehicle according to claim 1, comprising
an inside-air/outside-air changing mechanism configured to change a ratio between the outside air and air in the cabin in supplied air to the air conditioning unit,
wherein the inside-air/outside-air changing mechanism has a shutter configured to be movable, and
wherein the filter device is arranged upper than the inside-air/outside-air changing mechanism in a direction of stream of the outside air flowing from the outside air inlet portion toward the air conditioning unit.

* * * * *